United States Patent [19]

Sugahara, deceased et al.

[11] 4,405,371

[45] Sep. 20, 1983

[54] NOVEL CLAY MINERAL COLOR DEVELOPER FOR PRESSURE SENSITIVE RECORDING PAPER AND PROCESS FOR PRODUCING SAME

[75] Inventors: Yujiro Sugahara, deceased, late of Tokyo, Japan, by Mituko Sugahara, Yoshiyuki Sugahara, heirs; Koichi Usui, Shibata, Japan; Masahide Ogawa, Shibata, Japan; Teiji Sato, Shibata, Japan; Yasuo Mizoguchi, Shibata, Japan; Seiji Kojima, Nakajyo, Japan

[73] Assignee: Mizusawa Kagaku Kogyo Kabushiki Kaisha, Osaka, Japan

[21] Appl. No.: 279,191

[22] Filed: Jun. 30, 1981

[30] Foreign Application Priority Data

Jul. 3, 1980 [JP] Japan ..................... 55/89989

[51] Int. Cl.$^3$ ..................... C09D 11/00

[52] U.S. Cl. ..................... 106/21; 282/27.5; 427/150; 427/152; 428/446

[58] Field of Search ..................... 106/21; 427/150, 152; 428/446; 282/27.5

[56] References Cited

U.S. PATENT DOCUMENTS

| | | | |
|---|---|---|---|
| 3,622,364 | 11/1971 | Sugahara et al. | 106/288 B |
| 3,963,852 | 6/1976 | Baxter | 282/27.5 |
| 4,019,911 | 4/1977 | Vijayendran et al. | 106/22 |
| 4,047,738 | 9/1977 | Isaac et al. | 282/27.5 |
| 4,058,470 | 11/1977 | Moschovis et al. | 252/62.1 L |
| 4,071,646 | 1/1978 | Williams | 427/358 |
| 4,164,476 | 8/1979 | Watanabe et al. | 252/62.1 P |
| 4,329,257 | 5/1982 | Sommer et al. | 252/435 |

*Primary Examiner*—Lorenzo B. Hayes
*Assistant Examiner*—Amelia B. Yarbrough
*Attorney, Agent, or Firm*—Sherman & Shalloway

[57] ABSTRACT

A color developer for pressure-sensitive recording paper which is derived from a clay mineral having a layer-structure composed of regular tetrahedrons of silica and which shows (A) the diffraction pattern attributable to the crystals of layer-structure composed of regular tetrahedrons of silica when subjected to an electron diffraction analysis, but (B) substantially no diffraction pattern attributable to the crystals of said layer-structure when subjected to an X-ray diffraction analysis, and which (C) contains as the constituting elements besides oxygen, at least silicon, magnesium and/or aluminum.

This color developer is produced by acid-treating a clay mineral having a layer-structure composed of regular tetrahedrons of silica until its $SiO_2$ content reaches 82-96.5% by weight on dry basis (drying at 105° C. for 3 hours), contacting the resulting clay mineral, in an aqueous medium, with a magnesium and/or an aluminum compound or compounds which are at least partially soluble in said aqueous medium, neutralizing the system with an alkali or an acid to form hydroxide when the soluble compound or compounds employed are other than hydroxides, whereby introducing into the acid-treated clay mineral a magnesium and/or an aluminum component, and drying the product if desired. The color developer of this invention exhibits an improved color-developing ability particularly to the primary color development dye and an improved color-developing ability to the secondary color development dye, and shows excellent light resistance after the color development, little reduction in the color-developing ability after storage in an atmosphere of a high humidity and high temperature.

20 Claims, 8 Drawing Figures

NOVEL CLAY MINERAL COLOR DEVELOPER FOR PRESSURE SENSITIVE RECORDING PAPER AND PROCESS FOR PRODUCING SAME

This invention relates to a color developer which demonstrates pronounced color development effects when used in making manifold recording paper, i.e., the pressure-sensitive recording paper which can reproduce copies by handwriting, printing or typing without the use of conventional carbon paper, and to a process for producing such a color developer.

The pressure-sensitive recording papers, except for a few special cases, utilize the color development reaction resulting from the transfer of electrons between the colorless compound of organic coloring matter having electron donating property and a color developer, the electron acceptor. (U.S. Pat. No. 2,548,366)

As the colorless compound of organic coloring matter, the coloring reactant, two classes of coloring matter each of which exhibits different behaviors of coloration are used conjointly. One some of those, such as triphenyl methane phthalide coloring matter for example, develops color intensely and immediately upon contacting a solid acid, but the color tends to fade easily (primary color development dye). The second coloring matter is the one which does not develop color immediately upon contacting a solid acid but develops its color completely several days thereafter, and exhibits sufficient fastness against sunlight. As such a coloring matter, for example, leucomethylene blue coloring matters are used (secondary color development dye).

The typical primary color development dye is crystal violet lactone (CVL). As the secondary color development dye, benzoyl leucomethylene blue (BLMB) has been most commonly used.

Recently, also such coloring matters as fluoran green or black coloring matter, Michler's hydrol derivatives such as Michler's hydryl-para-toluenesulfinate (PTSMH), diphenylcarbazolylmethane coloring matters and spirodibenzopyran coloring matters are used either singly or in combination with the aforesaid primary color development dye.

As the color developer which is an electron acceptor, solid acids are normally used. It is known that particularly dioctahedral montmorillonite clay minerals shown excellent color-developing ability.

Of the octahedral montmorillonite clay minerals, especially acid clay and sub-bentonite produce favorable results.

It is also known that the specific surface area of such montmorillonite clay minerals as acid clay and sub-bentonite can be increased to 180 $m^2/g$ or more by an acid treatment, and the acid-treated clay minerals exhibit increased color-developing ability to the primary color development dye such as triphenylmethane phthalide coloring matter. For instance, the acid-treated acid clay is normally referred to as activated acid clay, and has been widely used as a color developer for pressure-sensitive recording paper.

Both inorganic and organic acids being useful for such an acid treatment, inorganic acids, particularly sulfuric and hydrochloric acids, are preferred because of the reasonable cost and ease of handling.

The acid-treating conditions are not critical. If a diluted acid is used, either the treating time becomes longer or the quantity of the required acid increases. Whereas, if an acid of high concentration is used, either the treating time becomes shorter or the quantity of the acid required becomes less. If the treating temperature is high, the treating time can be shortened. Thus the acid concentration can be freely selected within the range of 1–98%. In practice, however, it is known that the acid treatment can be conveniently effected at the acid concentration of around 15–80% and at the temperatures of 50°–300° C., because of the ease of handling.

Heretofore numbers of studies have been made to improve the color-developing ability of the acid-treated montmorillonite clay minerals.

For example, the present inventors did propose in the past a method of improving the color development effect of acid-treated montmorillonite clay minerals by adding thereto an alkaline substance such as an oxide, hydroxide or carbonate of an alkali metal or alkaline earth metal, or ammonia, or amine (Japanese Patent Publication No. 2373/66); a method of adding to said clay minerals calcium carbonate, silica, aluminum silicate, calcium silicate, iron oxide and the like, or an alkaline compound of alkaline earth metal such as calcium hydroxide (Japanese Patent Publication No. 2188/69); and a method of coating the receiving paper with the acid-treated montmorillonite clay minerals together with difficulty volatile organic amine (Japanese Patent Publication No. 1194/80).

According to those methods, however, there is a defect that when such color developers or the receiving papers coated therewith are stored over a prolonged period in a highly humid atmosphere, particularly under high temperatures, their color development effects tend to deteriorate, or the particles of the color developers aggregate to have a reduced dispersibility in water, making the coating operation difficult.

An object of the present invention is to provide a clay mineral color developer which exhibits clear and deep color-developing ability with not only the aforesaid primary color development dyes such as triphenylmethanephthalide coloring matters, e.g., CVL, but also with fluoran coloring matters, Michler's hydrol derivatives or mixtures thereof, as well as a process for making such a color developer.

Another object of the present invention is to provide a novel clay mineral color developer which shows little reduction in the color development effect or even an increase in said effect to some extent, after storage in a humid atmosphere, particularly in a highly humid atmosphere under high temperatures, and which is thus free from the most serious defect of the conventional clay mineral color developers; and to provide a process for making such a color developer.

Still another object of the present invention is to provide a clay mineral color developer which, when the receiving paper prepared therewith is contacted with the primary color development dye and/or the secondary color development coloring matter under a pressure to cause the color development, shows little degradation in the color development effect with time lapse; and to provide a process for making such a color developer.

An additional object of the present invention is to provide a color developer which can be derived from not only dioctahedral montmorillonite clay minerals, particularly acid clay, which have been regarded the best starting materials for making high quality color developers, but also easily available clay materials such as bentonite, kaoline and attapulgite, and which nevertheless exhibits excellent color-developing ability as described in the foregoing; as well as to provide a process for making such a color developer.

Other objects and advantages of the invention will become apparent from the following description.

Such a color developer of this invention can be produced, for example, through the steps of acid-treating a clay mineral having a layer-structure composed of regular tetrahedrons of silica until its $SiO_2$ content reaches 82–96.5% by weight, preferably 85–95% by weight, on dry basis (drying at 105° C. for 3 hours), contacting the resulting clay mineral, in an aqueous medium, with a magnesium and/or aluminum compound or compounds which are at least partially soluble in said aqueous medium, neutralizing the system with an alkali or an acid to form hydroxide when the soluble compound or compounds are other than hydroxides, whereby introducing into the acid-treated clay mineral a magnesium and/or an aluminum component, and drying the product if desired.

The compositions of typical clay minerals having the layer-structures composed of regular tetrahedrons of silica are as shown in Table 1 below, in which the contents (%) of $SiO_2$, $Al_2O_3$ and MgO as the main components are given.

TABLE 1

| | $SiO_2$ | $Al_2O_3$ | MgO |
|---|---|---|---|
| Dioctahedral montmorillonite (acid clay, bentonite, etc.) | 50–70 | 15–22 | 1–5 |
| Kaolin | 40–50 | 32–40 | 0–1 |
| Halloysite | 35–45 | 32–40 | 0–1 |
| Attapulgite | 50–60 | 5–12 | 5–12 |

Those clay minerals having the layer-structures composed of regular tetrahedrons of silica show the unique diffraction pattern characteristic to the crystals of said layer-structure, when subjected to an X-ray diffraction analysis. In the images, the diffraction pattern attributable to the crystal faces having Miller's indices of (020), (200) and (060) appears most clearly.

According to the present invention, such a clay mineral having the layer-structure composed of regular tetrahedrons of silica is intensely acid-treated until its $SiO_2$ content reaches 82–96.5% by weight, preferably 85–95% by weight, on dry basis (drying at 105° C. for 3 hours).

It is preferred according to the process of this invention that the acid treatment should be continued until the acid-treated clay mineral (in dry state) comes to give substantially no diffraction pattern attributable to the already specified crystal faces of the crystals having the layer-structure composed of regular tetrahedrons of silica possessed by the untreated clay mineral, when subjected to an X-ray diffraction analysis.

It is particularly preferred, that the acid treatment should be performed until not only the X-ray diffraction analysis but also an electron diffraction analysis of the acid-treated clay mineral can no more substantially show the characteristic diffraction pattern attributable to the crystals of the layer-structure composed of regular tetrahedrons of silica possessed by the untreated clay mineral.

According to the present invention, the clay mineral which has been acid-treated as above is then contacted with a magnesium and/or an aluminum compound in an aqueous medium, said magnesium and/or aluminum compound being at least partially soluble in said aqueous medium. The system is neutralized with an alkali or acid so that a hydroxide or magnesium and/or aluminum should be formed therein; if the added soluble compound or compounds were not hydroxides, whereby introducing the magnesium and/or aluminum component into the acid-treated clay mineral. The product is thereafter dried, if desired.

Through the foregoing procedures, a novel color developer for pressure sensitive recording paper which is derived from a clay mineral having a layer-structure composed of regular tetrahedrons of silica is provided, which is characterized in that (A) when it is analyzed by an electron diffraction, it gives the diffraction pattern attributable to the crystals of layer-structure composed of regular tetrahedrons of silica, but (B) it no more gives the diffraction pattern characteristic to the crystals of layer-structure when analyzed by an X-ray diffraction, and (C) it contains, as its constituting elements other than oxygen, at least silicon, magnesium and/or aluminum.

As the color developer for pressure-sensitive recording paper of this invention, that which satisfies the above conditions (A), (B) and (C), and furthermore which contains (D) silicon and magnesium and/or aluminum at such proportions that, as the atomic ratio, [silicon]/[sum of magnesium and/or aluminum] is 12/1.5 to 12, particularly 12/3 to 10, is preferred, [the sum of magnesium and/or aluminum] meaning the total of either one element, if either magnesium or aluminum alone is contained.

The process of this invention will be explained in further details hereinbelow.

According to the invention, the clay mineral having layer structure composed of regular tetrahedrons of silica is used as the starting material. Hence, the color developer of this invention is derived from such clay minerals.

As the typical examples of such clay minerals, the following may be named:

(1) dioctahedral and trioctahedral montmorillonite clay minerals such as acid clay, bentonite, beidellite, nontronite and saponite;

(2) kaolinite clay minerals such as kaolin, halloysite, dickite and nacrite;

(3) chain clay minerals such as sepiolite, attapulgite and palygorskite (sepiolite-palygorskite clay minerals);

(4) chlorite clay minerals such as leuchtenbergite, sheridanite, thuringite and chamosite; and (5) vermiculite clay minerals such as vermiculite, magnesium vermiculite and aluminum vermiculite.

Of those, particularly the dioctahedral montmorillonite clay minerals such as acid clay, kaolinite clay minerals such as kaolin and halloysite, and chain clay minerals such as attapulgite are preferred.

As already mentioned, the use of montmorillonite clay minerals, particularly acid clay, which have been treated with mineral acids such as sulfuric, nitric and hydrochloric acids, most commonly sulfuric acid, as the color developer for pressure-sensitive recording paper has been a common practice of old.

When an acid clay is treated with a mineral acid as above, the acid-soluble basic metal components in the developer, for example, such metal components as aluminum, magnesium, iron, calcium, sodium, potassium and manganese (which are present predominantly in the forms of oxides or hydroxides) are dissolved into the mineral acid, and consequently the $SiO_2$ content of the acid clay increases.

If the acid treatment is performed to an excessive degree (intensity) to remove too much of the basic metal components by elution, the resulting acid-treated acid clay (which is occasionally referred to also as an activated acid clay) has not only its color-developing ability with the secondary color development dye reduced, but also the light resistance of the color developed thereby with mainly the primary color development dye (e.g., CVL) markedly deteriorates. That is, the developed color fades notably with time lapse.

Thus the degree of acid treatment of acid clay is inherently limited, and under the conventionally adopted acid-treating conditions, the resulting acid-treated product (activated clay) comes to have a $SiO_2$ content of approx. 68–78% by weight. Even under considerably rigorous acid-treating conditions, the rise in $SiO_2$ content is at the most up to about 80% by weight.

On the other hand, it has been again known of old that the aforementioned montmorillonite clay minerals, kaolinite clay minerals, sepiolite-palygorskite clay minerals, chlorite clay minerals and vermiculite clay minerals have the crystals of layer-structure composed of regular tetrahedrons of silica, and hence, when examined by X-ray (or electron) diffraction analysis, they give the diffraction patterns characteristic to said crystals of layer-structure [Mineralogical Society (Clay Mineral Group), London, 1961, *The X-Ray Identification and Crystal Structures of Clay Minerals,* ed. by G. Brown].

When those clay minerals having the crystals of layer-structure composed of regular tetrahedrons of silica are acid-treated to such an advanced degree that their $SiO_2$ contents reach 82–96.5% by weight, particularly 85–95% by weight, on dry basis (e.g., after a drying at 105° C. for 3 hours), their crystals of layer-structure composed of regular tetrahedrons of silica are gradually destroyed as the acid treatment progresses, until, when the $SiO_2$ content reaches 82% by weight or higher, particularly 85% by weight or higher, the treated clay minerals become to give substantially none of the diffraction pattern characteristic to the crystals of such layer-structure in the X-ray (or electron) diffraction analysis.

Obviously the correlations among the degree of acid treatment, destruction of the crystals having the layer-structure and the ultimately occurring substantial disappearance of the characteristic diffraction pattern vary depending on the type and purity of clay minerals, pretreating conditions which may be given before the acid treatment (e.g., sintering and grinding conditions) and the like, and are by no means definite. Invariably for all cases, however, as the acid treatment progresses beyond a certain degree, the destruction of crystals having the layer-structure begins and progresses to ultimately result in the substantial disappearance of the diffraction pattern attributable to said crystals.

In the conventional practices of acid-treating, for example, montmorillonite clay minerals for making a color developer for pressure-sensitive recording paper, it has been regarded essential to select such acid-treating conditions as would not cause destruction of crystalline structure of the clay minerals, because otherwise the color-developing ability of the color developer would be seriously impaired [e.g., Journal of Industrial Chemistry (Kogyo Kagaku Zasshi), Vol. 67, No. 7 (1964) pp. 67–71].

Whereas, according to our studies, it became possible to produce an excellent color developer for pressure-sensitive recording paper, which can achieve the foregoing objects of the present invention, by the process comprising (1) intensely acid-treating a clay mineral having a layer-structure composed of regular tetrahedrons of silica, until its $SiO_2$ content reaches 82–96.5% by weight, preferably at least 85% by weight, on dry basis (drying at 105° C., for 3 hours) (which is hereinafter referred to conveniently as the first step), and then (2) contacting the resulting clay mineral, in an aqueous medium, with a magnesium and/or an aluminum compound or compounds which are at least partially soluble in said aqueous medium, neutralizing the system with an alkali or an acid to form hydroxide when the soluble compound or compounds employed are other than hydroxides, whereby introducing into the acid-treated clay mineral the magnesium and/or aluminum component, and drying the product if desired (this step is referred to as the second step for convenience).

When the clay mineral is intensely acid-treated until its $SiO_2$ content reaches at least 82% by weight, preferably at least 85% by weight, on dry basis, the crystals having the layer-structure composed of regular tetrahedrons of silica are destroyed, although in somewhat varied degrees, and such an intense acid-treatment has heretofore been regarded to say the least unnecessary, and generally undesirable.

According to the invention, against the above generally accepted concept, the clay mineral is subjected to such a specifically advanced degree of acid treatment as that its $SiO_2$ content reaches 82–96.5% by weight, preferably 85–95% by weight, in the first step. Upon introducing thereinto the magnesium and/or aluminum component in the second step, as already described, a clay mineral color developer having an extremely high color-developing ability to particularly triphenylmethane phthalide primary color development dye and fluoran dye, showing little reduction in color development effect even after storage in a humid atmosphere, particularly under high temperatures, and furthermore showing excellent light fastness after the color development, is obtained.

The important requirement in the first step according to the invention is (A) that the clay mineral should be so acid-treated that is $SiO_2$ content should reach 82–96.5% by weight, preferably 85–95% by weight, on dry basis (drying at 105° C. for 3 hours), and (B) more preferably it should be so acid-treated as to have a $SiO_2$ content within the above-specified range, and furthermore until it comes to show substantially no diffraction pattern attributable to the crystals of layer-structure composed of regular tetrahedrons of silica possessed by the starting clay mineral (before the acid treatment), when examined by means of X-ray diffraction.

According to our studies, if the acid-treatment is performed too rigorously until the $SiO_2$ content of the acid-treated clay mineral exceeds 96.5% by weight (on dry basis), the layers themselves which are composed of regular tetrahedrons of silica are excessively destroyed, and it becomes impossible to re-construct the layered crystalline structures composed of regular tetrahedrons of silica as will be later described, even by the treatment with a magnesium and/or an aluminum compound according to the second step of this invention. Hence the resulting clay mineral has markedly inferior color-developing ability, compared with the product of the present invention. It is essential, therefore, that the acid-treatment of the first step should be performed to such an extent that the $SiO_2$ content of the acid-treated clay mineral should not exceed 96.5% by weight.

Again, when the acid treatment is continued until the $SiO_2$ content of the treated clay mineral exceeds 95% by weight (on dry basis), the treating conditions become rigorous, and many treating hours are required. In addition to such economical disadvantages, the resulting product does not necessarily exhibit improved color-developing ability, but some types of clay minerals even show deterioration in said ability.

Hence, it is optimum to effect the acid-treatment to such an extent as will make the $SiO_2$ content of the acid-treated clay mineral 85–95% by weight, for economical reasons as well as for protecting the layers composed of regular tetrahedrons of silica from excessive destruction.

Japanese Patent Publication No. 4114/49 discloses that acid clay or analogous clay, from which all the components other than silicic acid have been substantially or completely removed by elution by a thorough acid treatment with a strong inorganic acid, becomes useful as a protective colloid, extender and filler, when treated with salts of metals other than alkali, e.g., the salts or hydroxides of aluminum, magnesium calcium, zinc, nickel and manganese. However, such clay from which all the components other than silica have been substantially or completely removed by elution cannot provide a good color developer even after the subsequent treatment with a magnesium or an aluminum compound, because its layers composed of regular tetrahedrons of silica have been excessively destroyed as mentioned above.

Thus as the acid-treating conditions in the first step of this invention, preferably the treatment is performed until the $SiO_2$ content of the clay mineral reaches 82–96.5% by weight, particularly 85–95% by weight, on dry basis and also until the treated clay mineral comes to show substantially no diffraction pattern characteristic to the layered crystalline structure composed of regular tetrahedrons of silica possessed by the untreated clay minerals, when examined by an X-ray diffraction analysis. It is particularly preferred, furthermore, to continue the acid treatment until not only the X-ray diffraction but also an electron diffraction analyses could no more detect the diffraction pattern characteristic to the layered crystalline structure.

Figure 3:
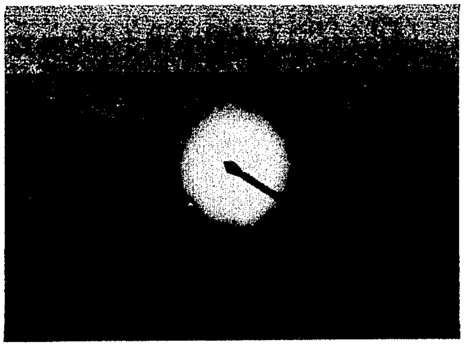
FIGS. 1 through 6 show the electron diffraction images of the starting clay and of the products of Control 1, Examples 1a, 1b, 2 and 3, respectively.
Figure 2:
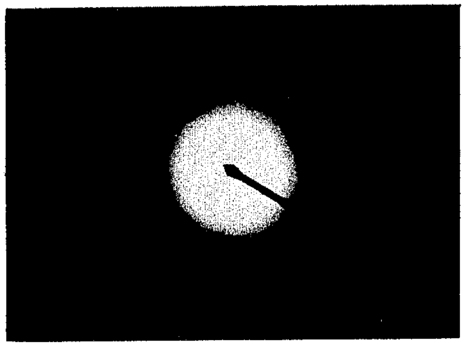
Figure 1:
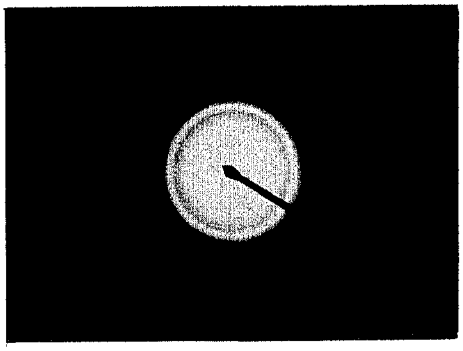
Figure 6:
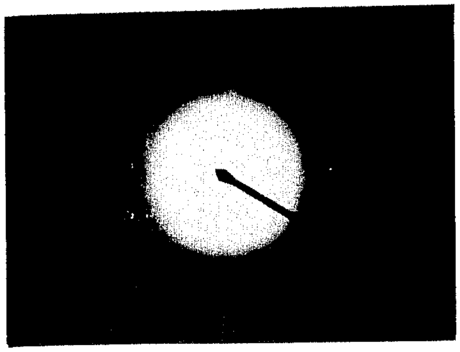
Figure 5:
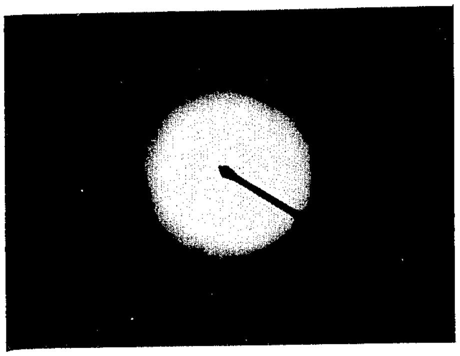
Figure 4:
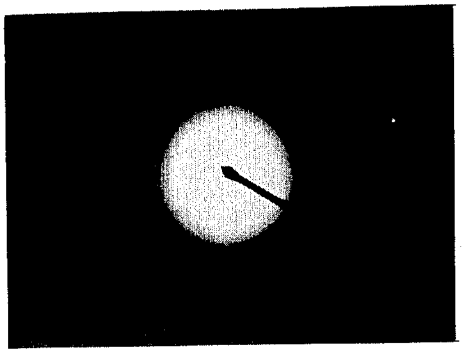

According to our studies, for example, the dioctahedral montmorillonite clay mineral produced in Arizona (U.S.A.) shows the characteristic diffraction pattern attributable to the layered crystalline structure (cf. FIG. 1 in later given Example 1) when examined with an electron diffractometery. When it is intensely acid-treated ($SiO_2$ content, approx. 94% by weight), the diffraction pattern attributable to said crystals substantially disappear even from the electron diffraction image (FIG. 2 of the same Example). Thus acid-treated clay mineral is treated, for example, with an aqueous magnesium chloride or aluminum chloride solution according to the second step of this invention, neutralized with an aqueous caustic soda solution, washed with water and dried. The products again show the diffraction pattern characteristic to the layered crystalline structure when examined with an electron diffractometory, as shown in FIGS. 3 and 4 of the same Example, respectively. This fact is believed to signify that although the crystals having the layer-structure composed of regular tetrahedrons of silica are destroyed by the acid-treatment of the first step, the layers themselves remain not completely destroyed, and that the remaining layers composed of regular tetrahedra of silica are re-constructed into crystals by the magnesium and/or aluminum component. This phenomenon with the clay mineral having a layer-structure composed of regular tetrahedrons of silica, i.e., that the crystals therein once destroyed by an acid treatment are re-constructed into the crystals based on the layer-structure composed of regular tetrahedrons of silica when a magnesium and/or an aluminum component is introduced thereinto as in the second step of this invention, is believed to be first discovered by the present inventor, no prior art referring to such a phenomenon.

An analysis of the electron diffraction pattern of the re-constructed crystals teaches that the spacing of the crystals re-constructed with magnesium component very closely resembles that of the starting montmorillonite clay mineral, but that of the crystals re-constructed with aluminum component is less than that of the starting montmorillonite clay minerals.

In view of those facts, it seems that the reconstructed crystals, particularly those re-constructed with aluminum component, differ from those of the starting clay minerals. Nevertheless the color developer according to this invention which shows the diffraction pattern of the crystals re-constructed with a magnesium or an aluminum component upon an electron diffraction analysis (the product of the second step of this invention) exhibits an improved color-developing ability particularly to the primary color development dye compared with the acid-treated product, as demonstrated in the later given Example 1 and Control 1, and furthermore also improved color-developing ability to the secondary color development dye. The color developer shows excellent light resistance after the color development, little reduction in the color-developing ability after storage in an atmosphere of a high humidity and high temperature, and apparently notable improvement in the color-developing ability.

In contrast thereto, as shown in the later given Controls 2, 3 and 7, such products as (A) that disclosed in Japanese Patent Publication No. 2188/69, Table 1, Sample No. 12, the acid clay which was acid-treated under the conventional conditions as indicated as the acid-treating conditions (B) in said prior art; and also the acid-treated clay into which a magnesium or an aluminum component was introduced according to the second step of this invention; or (B) that disclosed in Japanese Patent Publication No. 33213/73, which is prepared by adding an aqueous silicate solution to an aqueous magnesium salt solution under stirring to form a gel in which $SiO_2/MgO$ ratio is 70–80/30–20, adjusting the pH of the gel to 7–11, water-washing and drying the same; all show markedly inferior color-developing ability to that of the color former of this invention.

Hereinafter the conditions of practicing the first and second steps of this invention will be explained. [The first step]

What is important in the acid treatment of the clay minerals having the crystals of layer-structure composed of regular tetrahedrons of silica according to the invention is that the $SiO_2$ content of the acid-treated product should be increased to 82–96.5% by weight, preferably 85–95% by weight, on dry basis (drying at 105° C. for 3 hours). If the clay mineral to be treated is acid clay, it is particularly preferred to raise the $SiO_2$ content to at least 87% by weight on dry basis. The maximum allowable $SiO_2$ content being 96.5% by weight (on the specified dry basis), no appreciable advantage is obtained by raising the $SiO_2$ content beyond 95% by weight, in view of thereby increased severity in the acid-treating conditions and increased treating time.

The acid treatment can be effected in any known manner, using preferably a mineral acid such as sulfuric, nitric and hydrochloric acids, sulfuric acid being particularly preferred. An organic acid may be used conjointly with those mineral acids, however with no particular advantage.

Preferably at least two equivalents to the basic component to be eluted from the clay mineral of an acid is used. The acid-treating temperature is preferably 50° C. or higher, particularly 80° C. or higher. If sulfuric acid is used, the temperature can be as high as 300° C. The treating time can be shortened, the higher the concentration of the treating acid and the higher the treating temperature. Normally, however, it is preferred to perform the acid treatment for at least an hour.

If the acid concentration is low (e.g., 20–40% by weight), preferably the treatment is effected in two or more stages.

The termination of the acid-treatment can be determined by sampling the treated material, water-washing and drying the same, and quantitatively analyzing the dry sample to determine its $SiO_2$ content, preferably also MgO and $Al_2O_3$ contents; or measuring its electron diffraction pattern. Or, the treatment can be effected, following the conditions empirically determined in advance by those analyses.

In the acid treatment, it is particularly preferred to make the atomic ratio of [silicon(Si)]/[sum of magnesium and/or aluminum], from 12/1.6 to 12/0.05, particularly from 12/1.2 to 12/0.1.

If such clay minerals relatively stable against acid as, for example, kaolin, dickite and nacrite, are used as the starting clay minerals, preferably they are calcined at the temperature, for example 600°–900° C. in advance of the acid treatment, to be first converted to amorphous structures. [The second step]

The clay mineral thus acid-treated in the first step is washed with water, and contacted, in an aqueous medium, with a magnesium and/or an aluminum compound which is at least partially soluble in acid aqueous medium.

As the magnesium compound, for example, (A) an oxide or hydroxide of magnesium, and (B) an inorganic acid or organic acid salt of magnesium (inorganic acid salt being preferred because of easier removal of the acid radical) can be advantageously used.

Also as the aluminum compound, for example, (C) inorganic acid salts or organic acids salts of aluminum, particularly inorganic acid salts give favorable result.

As the salts of (B) and (C) above, not only normal salts, but acidic or basic, or complex or double salts may be used.

The above magnesium compounds and aluminum compounds may be used as mixtures.

Of the above-named salts, chloride, sulfate and nitrate are the most preferred.

In a preferred practice, the acid-treated clay mineral is washed with water, and contacted with an oxide or hydroxide of magnesium in the presence of water, being heated to a temperature of 50° C. or higher, particularly 80° C. or higher, for at least a certain stage during the contacting. When the acid-treated clay mineral is contacted with an oxide of magnesium, it is preferred to heat the system, for example, at 50° C. for at least approx. 3 hours, or at 80° C. for at least approx. an hour, under stirring. If it is to be contacted with magnesium hydroxide, the system is preferably heated, for example, at 50° C. for at least approx. 5 hours, or at 80° C. for at least approx. 3 hours, under stirring.

The color developer of this invention may also be prepared, however, by the steps of washing the acid-treated clay mineral with water, contacting the same with magnesium oxide or hydroxide in the presence of water at room temperature, preferably under stirring, filtering the residual liquid off and drying the remaining cake at a temperature of 100° C. or above.

We presume that such heating also contributes to the re-construction of the crystals based on the layers composed of regular tetrahedrons of silica remaining in the acid-treated material, effected by the mutual action between the acid-treated clay mineral and the magnesium component.

If an inorganic or organic acid salt or salts of magnesium and/or aluminum are used, it is advantageous that those salts should be dissolved, or dispersed, in water; added with the acid-treated and water-washed clay mineral, and neutralized with an alkali to a pH of about 7–12, particularly 9–11, is a magnesium salt is used; and to a pH of about 4–9, preferably 6–8, is an aluminum salt is used.

The contacting between the aqueous solution of salt and the acid-treated clay mineral can be effected by stirring under normal or elevated temperatures. It is preferred, however, that at least at a certain stage after the neutralization with an alkali, the system should be heated in the presence of water, to 50° C. or above, particularly 80° C. or above. This heating may be effected, as already mentioned, simultaneously with the drying of the clay mineral.

The amount of the magnesium compound and/or aluminum compound to be used in the second step is preferably such that, when expressed by atomic ratio, to 12 of Si in the acid-treated clay mineral, compounds used in the second step should become at least 1, preferably 3–12.

The product of the second step can be mixed with a dispersant, binder or the like either as it is or further filtered and concentrated, or diluted with water, to be converted into a slurry and coated onto the receiving sheet; or it may be filtered or concentrated, and dried under heating to provide a color developer for pressure-sensitive recording paper.

In a preferred practice, the clay mineral is ground at an optional stage during the first and second steps, to such an extent that of the total particles, at least 80% by weight, particularly 90% by weight, have the particle diameters not greater than 10 microns.

Simple mixtures of the clay mineral which has been acid-treated to have the $SiO_2$ content of 82–96.5% by weight, preferably 85–95% by weight, on dry basis, and particularly so acid-treated clay mineral showing no diffraction pattern characteristic to the layered crystalline structure possessed by the starting clay mineral upon X-ray or electron diffraction, with an oxide or hydroxide of magnesium and/or aluminum, in a wet or dry system, fail to show substantially improved color-developing ability to triphenylmethane phthalide primary color development dye and the colors developed therefrom show inferior ligh fastness. Whereas, the color developers resulting from the above-described second step of this invention has extremely good color-developing ability as already mentioned, and the developed colors exhibit excellent light fastness. This fact is believed to indicate that, during the contact between the acid-treated clay mineral in an aqueous medium, with the magnesium and/or aluminum compound which is at least partially soluble in said medium, in the second step of this invention, the magnesium and/or aluminum component is taken into the acid-treated clay mineral to participate in the re-construction of at least a part of the destroyed crystals, and that is an important factor for the excellent color-developing ability of the color developer according to this invention.

In other words, the treating conditions of the second step are not critical, so long as they allow the re-construction of the crystals based on the layer-structure composed of regular tetrahedrons of silica remaining in the acid-treated material (which can be confirmed by an electron diffraction analysis).

We also experimented on the use of the compounds of alkaline earth metals other than magnesium, which are at least partially soluble in the aqueous medium, such as the compounds of calcium, beryllium, as well as such compounds of zinc, titanium, zirconium and iron, as the substitute of magnesium and/or aluminum compound in the second step. None of those metal compounds, however, contributed to re-construct the destroyed crystals of the acid-treated clay mineral and neither showed any positive effect on the improvement in color-developing ability. It is quite surprising in view of this fact that only magnesium and/or aluminum component assists the re-construction of the destroyed crystals and brings about the remarkable improvement in the color-developing ability.

It is not the case, however, that the concurrent presence of a metal compound other than the magnesium and/or aluminum compound in the treating system of the second step is positively inhibited. [The color developer of this invention]

Thus, according to the preferred conditions of this invention, a color developer for pressure-sensitive recording paper which is derived from the clay mineral having a layered crystalline structure composed of regular tetrahedrons of silica is obtained, the characteristic features of said color developer residing in that (A) the color developer gives the diffraction pattern attributable to the crystals of a layer-structure composed of regular tetrahedrons of silica, upon an electron diffraction analysis, but (B) gives substantially no diffraction pattern attributable to said crystals of a layer-structure, upon an X-ray diffraction analysis, and (C) contains as the constituting elements other than oxygen, at least silicon, magnesium and/or aluminum.

Of such color developers of this invention, those in which the atomic ratios of silicon to magnesium and/or aluminum contained is, as silicon/sum of magnesium and aluminum, 12/1.5–12, particularly 12/3–10, are preferred.

It should be noted that as to the condition (B), i.e., that substantially no diffraction pattern attributable to the crystals of a layer-structure composed of regular tetrahedrons of silica is detected with an X-ray diffraction analysis, care must be taken on the following aspect.

That is, the clay minerals used as the starting material of this invention contain various impurities such as quartz, cristobalite, titanium oxide and feldspar. Each of such impurities has the crystalline structure characteristic thereto, and it is difficult to remove all of those impurities even with the intense acid treatment of the first step of this invention.

Consequently, the acid-treated clay mineral resulting from the first step of this invention occasionally gives the diffraction patterns attributable to the crystals of those impurities, when subjected to an X-ray or electron diffraction analysis. Those crystals of said crystalline impurities, however, do hot have the layered crystalline structure composed of regular tetrahedrons of silica.

What is destroyed by the acid-treatment of first step of this invention is the layered crystalline structure composed of regular tetrahedrons of silica, and the above requirement (B) signifies that the diffraction pattern attributable to such crystals of layer structure disappears, not those attributable to aforementioned crystalline impurities.

The color developer of this invention exhibits the excellent color-developing ability as above-described not only when used by itself as it is, but also when used in combination with known acid-treated dioctahedral montmorillonite clay minerals disclosed in, for example, Japanese Patent Publication No. 2188/69, or U.S. Pat. Nos. 3,622,364 and 3,753,761 (said clay minerals will be hereinafter referred to as the known acid-treated color developer or simply as known color developer). In the latter case, there is obtained a composite color developer which has a high color-developing ability with both the primary and secondary color development dyes, the developed color showing excellent light resistance; and which shows little deterioration in the color-developing ability after storage in an atmosphere of high temperature and humidity; and furthermore exhibits excellent color-developing ability with also diphenylcarbazolylmethane coloring matters.

Figure 8:
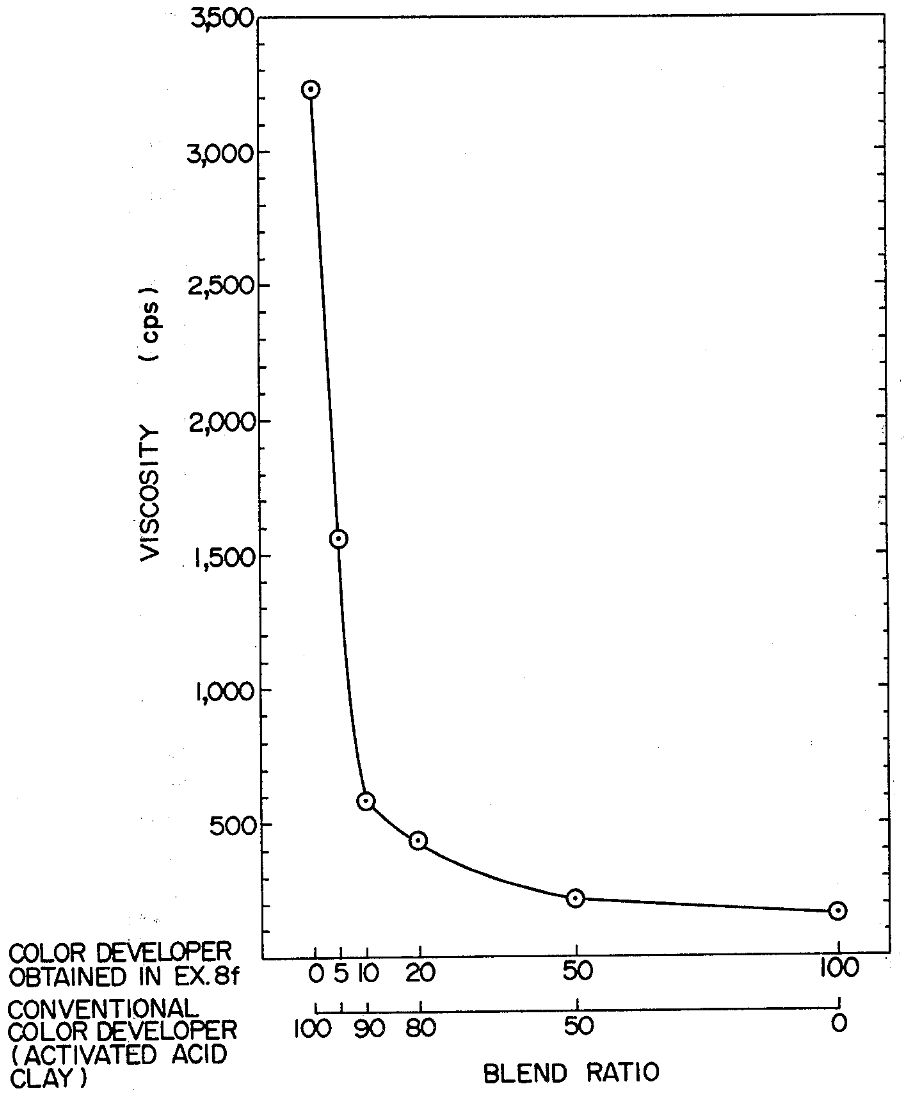
FIG. 8 shows the correlation between the viscosity of the coating slurry prepared from a mixture of the color developer obtained in Example 8f with a conventional color developer (activated acid clay) (solid component's concentration; 42%) and the blending ratio of the said two color developers.

Furthermore, when the color developer of this invention is mixed with the known acid-treated color developer disclosed in the above-identified prior art, i.e., that which is composed of acid-treated dioctahedral montmorillonite clay mineral having a specific surface area of at least 180 $m^2/g$, of which total particles at least 75% by weight having the particle diameters not greater than 10 microns and furthermore not more than 45% by weight having the particle diameters not greater than 1 micron; or composed of a mixture of above-specified clay mineral with natural dioctahedral montmorillonite clay mineral; said color developer preferably having the secondary color development property, $K_2$, of at least 1.40, the value of $K_2$ being determined by the formula, $$K_2 = \frac{R_{430}}{R_{550}} + \frac{1}{2}(1 - R_{550})$$

wherein $R_{430}$ and $R_{550}$ are reflectances of light having wavelengths 430 mμ and 550 mμ, respectively, when said mineral is developed by benzoyl leucomethylene blue, to form an aqueous slurry having a pH of at least 7, preferably 8–11, the slurry shows extremely low viscosity as shown in the appended FIG. 8. Hence, the coating operation of base paper with the slurry is very easy. Not only that, the slurry concentration can be raised to reduce the water content, saving the energy consumption required for drying the slurry. Still another advantage is that the coating speed can be increased.

As illustrated in FIG. 8, the presence of only 3%, based on the total weight of the above mixture, of the color developer of this invention can considerably reduce the viscosity of resulting slurry compared with that of the slurry composed of the known color developer alone. Thus, the viscosity of the mixture containing 10% by weight or more of the color developer of this invention becomes as low as approximately equivalent to that of the color developer of this invention alone. Such a fact is quite surprising.

Hence, when the color developer of this invention is used as a mixture with the known color developer, the mixture should contain at least 3% by weight, preferably at least 5% by weight, inter alia, at least 10% by weight, of the color developer of this invention.

That is, the preferred blend ratio of the color developer of this invention with the known acid-treated color developer ranges from 90/10 to 10/90, particularly from 80/20 to 20/80, by weight.

Hereinafter the present invention will be explained with reference to the working Examples.

Test methods.

The test methods of the properties of the products given in this specification were as follows.

1. Electron diffraction

An electron microscope (JEM-100CX) of Nippon Denshi K. K., having an acceleration voltage 100 KV was used. Every sample was held on a sheet of carbon meshes by water-paste method. The electron diffraction image was obtained, with the vision limited to one micron.

2. X-ray diffraction

An X-ray diffractometer (Geigerflex 2028) of Rigaku Denki K. K. was used. The diffraction conditions were as follows:

| | |
|---|---|
| target | Cu |
| filter | Ni |
| voltage | 40 KV |
| electric current | 20 mA |
| count. full scale | 4,000 c/s |
| time constant | 0.5 s |
| chart speed | 4 cm/min |
| scanning speed | 4°/min |
| diffraction angle | 1° |
| slit width | 0.3 mm. |

3. Determination of atomic ratio

The constituting elements of each sample were analyzed quantitatively by the method known per se, to determine the contents (%) of $SiO_2$, MgO and $Al_2O_3$. Then the atomic ratio was calculated as follows:

atomic ratio, Si/(Mg and/or Al) =

$$\frac{SiO_2\,(\%)}{60} \Big/ \left( \frac{MgO\,(\%)}{40} \text{ and/or } \frac{Al_2O_3\,(\%)}{51} \right)$$

4. Color development performance 4-1 Preparation of receiving sheet

Sodium hexamethaphosphate 0.2 g was dissolved in 35 g of water. The test sample 20 g (as dried at 110° C.) was added to the solution, and the pH was adjusted to about 9.5 with 20% NaOH aqueous solution, followed by addition of an aqueous starch solution (20%) 3 g and SBR-latex (Dow No. 620, solid concentration 50%, pH 7) 6.8 g, and again by the pH adjustment with 20% NaOH to 9.5. The total volume of the system was made 80 g by adding water. After a thorough mixing with a stirrer to cause uniform dispersion, the slurry was applied to 8 sheets of base paper (thinly to 4 and thickly to the rest) with two different coating rods (wire diameters: 0.15 mm and 0.25 mm, respectively). The coated papers were air-dried and then dried at 110° C. for 3 minutes, measured of the coating amount (determined from the weight difference between the uncoated base paper and the evenly coated base paper, as to the cut-out pieces of identical area). In each group, the coated sheets were halved to form two 4-membered sets (coating amount identical). The coating amount of the two types of receiving sheets is around 6 g/m$^2$, a little less for the thinly coated, and a little more for the thickly coated.

In certain cases NaOH was not used, that is, the slurry was applied without the pH adjustment. 4-2. Initial color-developing ability One of the above two sets of receiving sheet (coated front) was placed in a desiccator with saturated brine (75% RH), and maintained in the dark place at room temperature (25° C.).

Approximately 24-hours after the coating, the samples were taken out of the desiccator, exposed to the indoor atmosphere (constant temperature and humixity: approx. 25° C., and 60% RH, respectively) for 16 hours and thereafter caused to develop color. The receiving sheets were superposed with each different four types of transfer sheets (coated back), i.e., (1) a transfer sheet coated with the microcapsules containing CVL (crystal violet lactone) which is an instantaneous color-developing leuco dye (CVL paper), (2) a transfer sheet coated with the microcapsules containing BLMB (benzoyl leucomethylene blue) which is a secondary color development dye (BLMB paper), (3) a transfer sheet coated with the microcapsules containing a diphenyl carbazolyl methane type leuco dye (DCM paper) and (4) a transfer sheet coated with the microcapsules containing Michler's hydryl p-toluene sulfinate which is a lueco dye developing red violet color (PTSMH paper) or (5) a commercially sold transfer sheet coated with the microcapsules containing a mixture of above CVL and BLMB, and further a fluoran dye (mixed dye paper) with their coated surfaces facing each other, and together inserted between a pair of steel rolls. By the pressurized rotation of the steel rolls, the microcapsules were completely ruptured. The color-developing ability of each receiving sheet was determined by measuring the color development density (which may be hereinafter referred to simply as density) with a densitometer (Fuji Shashin Film K.K., Fuji Densitometer Model-P), at an hour after the color development as to the CVL, PTSMH and mixed dye papers which are expected to develop color instantaneously, and at a day after the color development as to the BLMB and DCM dye papers which are expected of secondary color development. The given values are the average of those measured with the four sheets. Higher densities indicate higher color-developing ability.

The color-developing ability of a sample color developer (density [A]) is expressed by the density [A] on the receiving sheet coated with 6 g/m$^2$ of the color developer calculated from the density [$A_1$] of the thinly coated ($a_1$ g/m$^2$) receiving sheet and the density [$A_2$] of the thickly coated ($a_2$ g/m$^2$) receiving sheet.

In the calculation, because the density and coating amount are in substantially linear relationship (direct proportion) with the receiving sheets coated with an identical sample in the amounts around 6 g/m$^2$, the density [A] can be determined from the equation below.

Initial color-developing ability:

$$[A] = [A_1] + \frac{\{[A_2] - [A_1]\}(7 - a_1)}{a_2 - a_1}$$

4-3. Moisture resistance of receiving sheet:

Each 4-membered set of the receiving sheets (the other set of that used for the initial color-developing ability test) was placed in a desiccator charged with water (100% RH) and treated at 40° C. for 96 hours to be accelerated of deterioration. The samples withdrawn from the desiccator were exposed to the indoor atmosphere for 16 hours similarly as in the initial color-developing ability test, and thereafter caused to develop $$[B] = [B_1] + \frac{\{[B_2] - [B_1]\}(7 - a_1)}{a_2 - a_1}$$

moisture resistance of receiving sheet:

$[B]/[A]$).

4-4. Light resistance

The color-developed sheet used in the initial color-developing ability test was irradiated with an artificial UV light (carbon arc lamp) for two hours, as set in a weather-meter (Suga Shikenki K.K., Standard Sunshine Weather-meter, WE-SUN-HC model). The density of the developed color which was faded upon the irradiation was measured. The density [C] of the developed color on the receiving sheet coated with 6 g/m$^2$ of sample color developer, after the facing, was calculated from the similar densities of thinly coated and thickly coated receiving sheets ([$C_1$] and [$C_2$], respectively) as in the foregoing. The light resistance is expressed by the ratio of said [C] to the initial color-developing density ([A]), i.e., ([C]/[A]).

$$[C] = [C_1] + \frac{\{[C_2] - [C_1]\}(7 - a_1)}{a_2 - a_1}$$

Light resistance:

$[C]/[A]$.

4-5. Evaluation of color-developing ability:

The color developing ability was evaluated from the measured values of density of colors developed on the surfaces of receiving sheets by the pressurized contact with specified transfer sheets, and from the observations with naked eye. The results of evaluation are indicated according to the following standards.

Initial color-Developing Ability

| Evaluation mark | Norms of evaluation | Color development density [A] (× 10$^2$) ranges: CVL color development | BLMB color development | DCM color development | PTSMH color development | Mixed (containing fluoran) |
|---|---|---|---|---|---|---|
| X | impractical due to very poor color development | no more than 60 | no more than 15 | no more than 40 | no more than 60 | no more than 60 |
| Δ | usable but poor color development | 61-70 | 16-20 | 41-50 | 61-70 | 61-70 |
| ○ | practical color development | 71-80 | 21-25 | 51-60 | 71-80 | 71-80 |
| ◎ | better color development than | 81-100 | 26-30 | 61-70 | 81-100 | 81-100 |
| ● | excellent color development | not less than 101 | not less than 31 | not less than 71 | not less than 101 | not less than 101 |

colors. The color-developing ability of the receiving sheet coated with 6 g/m$^2$ of the sample color developer, after the above deteriorating treatment (density [B]) was again calculated from those of the thinly and thickly coated receiving sheets ([$B_1$] and [$B_2$], respectively). The moisture resistance of a receiving sheet is expressed by the ratio of above [B] to the initial color-developing ability (density [A]), i.e., ([B]/[A]).

Moisture Resistance of Receiving Sheet

| Evaluation mark | Norm of evalution | Moisture resistance [B]/[A] ranges: CVL color development | mixed color development |
|---|---|---|---|
| X | impractical due to very poor moisture resistance | no more than 0.80 | no more than 0.80 |
| Δ | usable but low moisture resistance | 0.81-0.85 | 0.81-0.85 |
| | practical moisture resistance | 0.86-0.90 | 0.86-0.90 |

-continued

Moisture Resistance of Receiving Sheet

| Evaluation mark | Norm of evalution | Moisture resistance [B]/[A] ranges CVL color development | mixed color development |
|---|---|---|---|
| | better moisture resistance than | 0.91–0.95 | 0.91–0.95 |
| • | excellent moisture ○ resistance | at least 0.96 | at least 0.96 |

Light Resistance of Impressed Images

| Evaluation mark | Norm of evalution | Light resistance [C]/[A] ranges CVL color development | mixed color development |
|---|---|---|---|
| X | impractical due to very poor moisture resistance | no more than 0.40 | no more than 0.50 |
| Δ | usable but low light resistance | 0.41–0.50 | 0.51–0.60 |
| ○ | practical light resistance | 0.51–0.60 | 0.61–0.70 |
| ◎ | better light resistance than ○ | 0.61–0.70 | 0.71–0.80 |
| ◉ | excellent light resistance | at least 0.71 | at least 0.81 |

5. Measurement of viscosity of coating slurry

The pot of a household mixer (National MX-520G model) was charged with 150 g of water, in which then 1.5 g of sodium hexamethaphosphate was dissolved. Adding thereto 150 g of a sample (on dry basis, dried at 110° C.), 20% aqueous NaOH solution to make the pH approximately 9.5, 22.5 g of an aqueous starch (20%) and 51 g of an SBR-latex (Dow No. 620, solid concentration 50%, pH 7), by the order stated, the system was lightly stirred to be homogenized, and again adjusted of its pH to 9.5 with the 20% NaOH solution. A minor amount of water was added to make the total solid concentration 40.5–41.5% [Slurry I] or 42.5–43.5% (Slurry II).

The mixer was operated, to effect a stirring for 5 minutes (at approx. 6,500 rpm.), and the resulting slurry was transferred into a beaker, and its temperature was controlled to 25° C., standing under mild stirring (500 r.p.m.) for 15 minutes in a constant temperature bath. Two minutes thereafter the viscosity [unit, centipoises, (cps)] of the system was measured with a Brookfield viscometer.

From the measured values of the slurry I and II, the viscosity of the slurry having a solid concentration of 42% was calculated by interpolation. Thus obtained value was made the viscosity of 42% coating slurry sample.

EXAMPLE 1a

A montmorillonite clay mineral (Arizona, U.S.A.) was comminuted by stirring with water, and made into a 20% aqueous slurry, 500 g of which was heated, together with 150 g of 97% sulfuric acid and 50 g of water, on a 95° C. water bath for 10 hours. In the meantime, the slurry was stirred at every 30 minutes to promote the reaction. Thereafter the treating liquid was removed by suction filtration. Again water and 150 g of 97% sulfuric acid were added to the system to make the total volume 700 g, which was acid-treated at 95° C. for 10 hours. Filtering the system, the remaining cake was washed with water, placed in a pot mill, added with water and wet-pulverized together with Korean chart pebbles, to form a 15% slurry (the first step).

Thus obtained slurry (the $SiO_2$ content in its dry solid component; 93.30%) 429 g ($SiO_2$ content; 60 g) was heated to 80° C., and into which 500 ml of an aqueous magnesium chloride solution having 1 mole concentration was added dropwise under stirring, consuming approximately 30 minutes, and the system was aged for the following 30 minutes. Further 400 g of a 10% aqueous sodium hydroxide solution was dropped into the system consuming approximately 30 minutes to neutralize the system, followed by aging for 30 minutes to complete the reaction (pH; 9.2). Filtering the system, the recovered cake was meshed with water, dried at 110° C., pulverized with a small-size impact mill, and removed of coarse grains with a winnowing type classifier. Thus a powdery color developer as white, fine particles was obtained (the second step).

EXAMPLE 1b

After the first step of above Example 1-a, the second step was performed as follows. The slurry obtained in said first step, 425 g, was heated to 80° C., and into which 500 ml of an aqueous aluminum chloride solution having 1 mole concentration was dropped under stirring, consuming approximately 30 minutes, followed by aging for 30 minutes. Then, 600 g of 10% aqueous sodium hydroxide solution was dropped into the system over approximately 45 minutes to neutralize the system, followed by aging for 30 minutes to complete the reaction (pH; 6.9). Filtering the system, the recovered cake was washed with water, dried at 110° C., pulverized with a small-size impact mill, and removed of coarse grains with a winnowing type classifier, to provide a powdery color developer composed of white, fine particles (the second step).

EXAMPLE 2

A kaolin clay powder (Georgia, U.S.A.) was calcined at 700°. for 2 hours. Thus prepared metakaolin 100 g was heated, together with 350 g of water and 250 g of 97% sulfuric acid, on a 95° C. water bath for 10 hours. In the meantime, the slurry was stirred at every 30 minutes to promote the reaction. Thereafter the treating liquid was removed by suction filtration, and again water and 250 g of 97% sulfuric acid were added to the system to make the total volume 700 g, which was acid-treated at 95° C., for 10 hours. Filtering the system, the recovered cake was washed with water, placed in a pot mill, added with water and wet-pulverized with Korean chart pebbles to provide a 15% slurry.

Thus obtained slurry ($SiO_2$ in the dry solid component; 87.91%) 455 g ($SiO_2$ content; 60 g) was subjected to the identical procedures as described in Example 1b (the second step).

EXAMPLE 3

An attapulgite clay powder (Florida, U.S.A., water content 9.1%) 110 g was heated, together with 290 g of water and 300 g of 36% hydrochloric acid, on a 95° C. water bath for 10 hours. In the meantime, the slurry was stirred at every 30 minutes to promote the reaction. Thereafter the treating liquid was removed by suction filtration, and water and 300 g of 36% hydrochloric acid were again added to the system to make the total volume 700 g, which was acid-treated at 95° C. for 10 hours. Filtering the system, the recovered cake was washed with water, placed in a pot mill, added with water and wet-pulverized with Korean chart pebbles to form a 15% slurry.

Thus obtained slurry ($SiO_2$ content in the dry solid component; 90.91%) 440 g ($SiO_2$ content; 60 g) was subjected to the identical procedures with those described in Example 1b (the second step).

CONTROL 1

The cake of acid-treated material as washed with water, which was obtained in the first step of Example 1a, was dried at 110° C., pulverized with a small-size impact mill and removed of the coarse grains by a winnowing type classifier to provide a white, finely particulated powder.

The fine, particulate powders obtained in Examples 1a, 1b, 2, 3 and Control 1 were coated onto the base paper according to the specified method, and the resulting receiving sheets were subjected to the color-developing ability test with the results as given in Table 1. The electron diffraction images of the dry powder of starting clay (montmorillonite produced in Arizona) and of the products of Control 1, Examples 1a, 1b, 2 and 3 are given in FIGS. 1-6, respectively, and also the X-ray diffraction images of same samples are given in FIG. 7.

Figure 7:
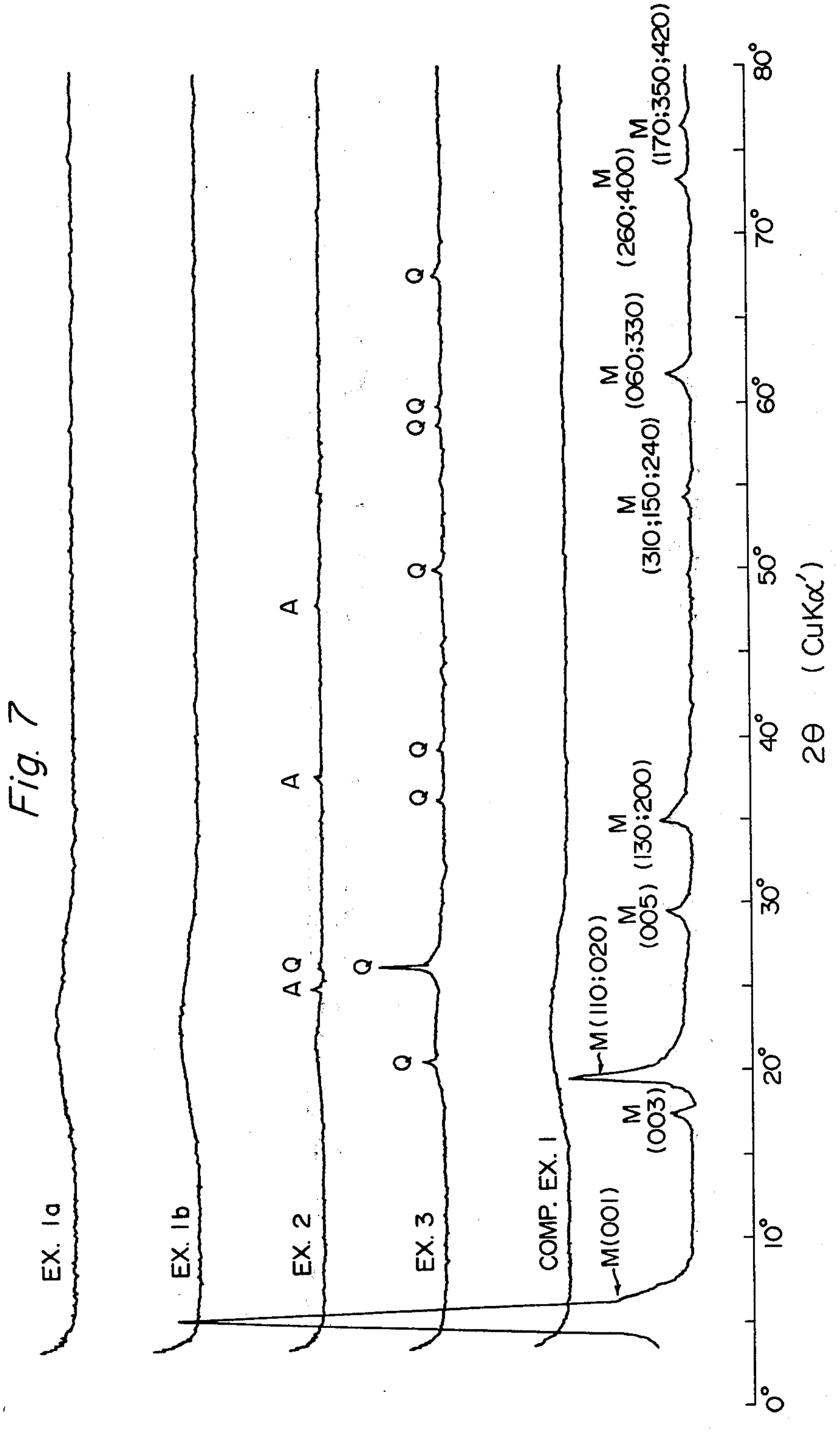
FIG. 7 shows their X-ray diffraction patterns by the order stated.

Incidentally, A in FIG. 7 is the diffraction pattern attributable to anatase-form $TiO_2$ crystals, Q is that of quartz crystals and M is that of montmorillonite crystals, the numerals in the parentheses denoting the indices of the planes. Also the diffraction image at the bottom of FIG. 7 is of the starting clay used in Example 1a.

hours. Thereafter the system was filtered, and the recovered cake was washed with water. A minor amount of the cake was dried at 110° C., pulverized and subjected to a quantitative analysis, to be found to contain 82.2% $SiO_2$ (on dry basis, dried at 105° C.). The cake was placed in a pot mill, added with water and wet-pulverized in the presence of Korean chert pebbles to provide a 15% slurry (the first step).

To 486 g of the slurry ($SiO_2$ content; 60 g), 20 g of magnesium oxide was added, heated to 80° C. and reacted for 5 hours under stirring. Thereafter the system was filtered, and the recovered cake was dried at 110° C., pulverized and removed of coarse grains by winnowing, to provide a finely particulated powder (the second step).

EXAMPLE 4b

To 250 g of the same roughly crushed and rod-shaped clay as used in Example 4a, 500 ml of 34% sulfuric acid corresponding to 2.5 times of the gram-equivalent number of the total basic metal components contained in said clay was added. Subsequently the procedures of the step 1 of Example 4a were repeated to provide a 15% slurry of the acid-treated clay which contained 85.6% (on dry basis, dried at 105° C.) of $SiO_2$.

Then the procedures identical with those of the second step of Example 4a were repeated, starting upon adding 20 g of magnesium oxide to 468 g of the resultant slurry ($SiO_2$ content; 60 g).

EXAMPLE 4c

To 250 g of the same roughly crushed and rod-shaped acid clay as used in Example 4a, 600 ml of 34% sulfuric

TABLE 1

| Sample No. | | | | Example 1a | Example 1b | Example 2 | Example 3 | Control 1 | Starting clay |
|---|---|---|---|---|---|---|---|---|---|
| Diffraction pattern by electron diffraction | | | | present | present | present | present | present | present |
| Diffraction pattern by X-ray diffraction | | | | none | none | none | none | none | present |
| Color-developing ability | CVL color development | initial color-developing ability | density [A](× $10^{-2}$) | 106 | 117 | 102 | 102 | 80 | — |
| | | | evaluation | ◉ | ◉ | ◉ | ◉ | ○ | — |
| | | moisture resistance of receiving sheet | [B]/[A] | 0.98 | 0.99 | 0.98 | 0.99 | 0.88 | — |
| | | | evaluation | ◉ | ◉ | ◉ | ◉ | ○ | |
| | | light resistance of impressed images | [C]/[A] | 0.66 | 0.75 | 0.63 | 0.66 | 0.25 | — |
| | | | evaluation | ◎ | ◉ | ◎ | ◎ | X | — |
| | BLMB color development | initial color-developing ability | density [A](× $10^{-2}$) | 28 | 31 | 27 | 29 | 14 | — |
| | | | evaluation | ◎ | ◉ | ◎ | ◎ | X | — |
| | mixed color development (containing fluoran) | initial color-developing ability | density [A](× $10^{-2}$) | 107 | 115 | 103 | 104 | 78 | — |
| | | | evaluation | ◉ | ◉ | ◉ | ◉ | ○ | — |
| | | moisture resistance of receiving sheet | [B]/[A] | 1.00 | 0.99 | 0.99 | 1.01 | 0.88 | — |
| | | | evaluation | ◉ | ◉ | ◉ | ◉ | ○ | — |
| | | light resistance of impressed images | [C]/[A] | 0.81 | 0.89 | 0.75 | 0.79 | 0.35 | — |
| | | | evaluation | ◉ | ◉ | ○ | ○ | X | — |

EXAMPLE 4a

An acid clay (Nakajyo, Niigata-ken, Japan) was roughly ground and shaped into rods (3 mm each in diameter). To 250 g of the rods, 400 ml of 34% sulfuric acid corresponding to the 2 times of the gram-equivalent number of the total basic metal components contained in the acid clay such as aluminum, magnesium, calcium, iron, sodium, potassium and titanium (1.14 gram-equivalents/100 g of dry clay) was added, and the system was acid-treated on a 85° C. water bath for 15 acid corresponding to 3 times of the gram-equivalent number of the total basic metal components contained in said clay was added. Subsequently the system was treated similarly as in the first step of Example 4a, to provide a 15% slurry of the acid-treated material which contained 89.0% (on dry basis, dried at 105° C.) of $SiO_2$.

The procedures of the second step of Example 4a were repeated with the system composed of 449 g ($SiO_2$ content; 60 g) of the above slurry and 20 g of magnesium oxide.

EXAMPLE 4d

To 250 g of the same roughly crushed and rod-shaped acid clay as used in Example 4a, 700 ml of 34% sulfuric acid of corresponding to 3.5 times of the gram-equivalent number of the total basic metal components contained in said clay was added. Subsequently, the system was treated similarly as in the first step of Example 4a, to provide a 15% slurry of the acid-treated material which contained 92.7% (on dry basis, dried at 105° C.) of $SiO_2$.

Then the procedures identical with those of the second step of Example 4a were repeated with the system composed of 431 g of the slurry ($SiO_2$ content; 60 g) and 20 g of magnesium oxide.

EXAMPLE 4e

To 250 g of the same roughly crushed and rod-shaped acid clay as used in Example 4a, 800 ml of 34% sulfuric acid corresponding to 4 times of the gram-equivalent number of the total basic metal components contained in said clay was added. Repeating the subsequent treatments identical with those practiced in the first step of Example 4a, a 15% slurry of the acid-treated material was obtained, which contained 95.0% (on dry basis, dried at 105° C.) of $SiO_2$.

The procedures identical with those of the second step of Example 4a were repeated with a system composed of 421 g ($SiO_2$ content; 60 g) of the above-obtained slurry and 20 g of magnesium oxide.

EXAMPLE 4f

To 250 g of the same roughly crushed and rod-shaped acid clay as used in Example 4a, 900 ml of 34% sulfuric acid corresponding to 4.5 times of the gram-equivalent number of the total basic metal components contained in said clay was added. Thereafter the system was treated similarly as in the step 1 of Example 4a, to provide a 15% slurry of the acid-treated clay which contained 96.3% (on dry basis, dried at 105° C.) of $SiO_2$.

Then the procedures identical with those of the second step of Example 4a were repeated with a system composed of 415 g ($SiO_2$ content; 60 g) of the above-obtained slurry and 20 g of magnesium oxide.

CONTROL 2

To 500 g of the same roughly crushed and rod-shaped acid clay as used in Example 4a, 800 ml of 34% sulfuric acid corresponding to 2 times of the gram-equivalent number of the total basic metal components contained in said clay was added, and heated on a 85° C. water bath for 7 hours to effect the acid-treated [the acid-treating condition (B) of sample No. 12 in Table 1, Japanese Patent Publication No. 2188/69]. Then the system was filtered, and the recovered cake was washed with water. A minor amount of the cake was dried at 110° C., pulverized and subjected to a quantitative analysis to be found to contain 77.4% of $SiO_2$. Approximately a half of the cake was dried at 110° C., pulverized and removed of coarse grains by winnowing, to provide a finely particulated powder (said Publication No. 2188/69).

CONTROL 3

The remaining half of the cake obtained in Control 2 above was placed in a pot mill, added with water and wet-pulverized to provide a 15% slurry.

Twenty (20) g of magnesium oxide was added to 516 g ($SiO_2$ content; 60 g) of the above slurry, and together heated to 80° C. and reacted for 5 hours under stirring. Filtering the system, the recovered cake was dried at 110° C., pulverized and removed of coarse grains by winnowing, to provide a finely particulated powder.

CONTROL 4

To 500 g of the same roughly crushed, rod-shaped acid clay, 1686 ml of 45% sulfuric acid corresponding to 6 times of the gram-equivalent number of the total basic metal components contained in the clay was added. The acid treatment of the clay was effected by heating the system to ca. 90° C. in a 90° C. water bath for 10 hours, with occasional mild stirring (Example 1 of Japanese Patent Publication No. 4114/49). Then the system was filtered, and the recovered cake was washed with water. A minor amount thereof was dried at 110° C., pulverized and subjected to a quantitative analysis, to be found to have a $SiO_2$ content of 97.3%. The cake was placed in a pot mill, added with water and wet-pulverized to provide a 15% slurry.

Twenty (20) g of magnesium oxide was added to 411 g of the slurry ($SiO_2$ content; 60 g), and heated to 80° C. and reacted for 5 hours under stirring. Then the system was filtered, and the recovered cake was dried at 110° C. and pulverized to provide a finely particulated powder.

CONTROL 5

Eight (8) g of magnesium oxide was added to 493 g of the slurry obtained in Control 4 ($SiO_2$ content 72 g), and heated to 80° C. and subjected to the neutralization reaction for 5 hours under stirring. Then the system was filtered, and the recovered cake was dried at 45° C. and pulverized to provide a fine, particulate powder (Example 2 of aforesaid Publication No. 4114/49).

The properties of the powders obtained in Examples 4a–4f, and Controls 2–5 are shown in Table 2, and the results of color-developing ability test given to the receiving sheets coated with such powders by the already specified methods, in Table 3.

TABLE 2

| Sample No. | Contents of chief components in the reaction material (acid-treated acid clay) % $SiO_2$ | MgO | $Al_2O_3$ | Atomic ratio in the reaction material (acid treated acid clay) [Si/(Mg and/or AlO] | Reacting atomic ratio Si/Mg | Atomic ratio in the color developer [Si/(Mg and/or Al)] | Diffraction pattern by electron diffraction | Appearance of 15% slurry of reaction material (acid-treated acid clay) |
|---|---|---|---|---|---|---|---|---|
| Control 2 | 77.4 | 2.3 | 10.4 | 12/2.4 | 12/0 | 12/2.4 | present (strong) | off-white opaque suspension |
| Control 3 | 77.4 | 2.3 | 10.4 | 12/2.4 | 12/6 | 12/8.2 | present (strong) | off-white, opaque suspension |
| Example | | | | | | | | white, opaque |

TABLE 2-continued

| Sample No. | Contents of chief components in the reaction material (acid-treated acid clay) % SiO$_2$ | MgO | Al$_2$O$_3$ | Atomic ratio in the reaction material (acid treated acid clay) [Si/(Mg and/or AlO] | Reacting atomic ratio Si/Mg | Atomic ratio in the color developer [Si/(Mg and/or Al)] | Diffraction pattern by electron diffraction | Appearance of 15% slurry of reaction material (acid-treated acid clay) |
|---|---|---|---|---|---|---|---|---|
| 4a | 82.2 | 1.5 | 7.2 | 12/1.6 | 12/6 | 12.7.4 | present | suspension |
| Example 4b | 85.6 | 1.0 | 5.2 | 12/1.1 | 12/6 | 12/6.9 | present | white, opaque suspension |
| Example 4c | 89.0 | 0.5 | 3.4 | 12/0.65 | 12/6 | 12/6.4 | present | white, opaque suspension |
| Example 4d | 92.7 | 0.2 | 1.5 | 12/0.28 | 12/6 | 12/6.1 | present | white, opaque suspension |
| Example 4e | 95.0 | 0.1 | 0.8 | 12/0.2 | 12/6 | 12/5.9 | present | white, opaque suspension |
| Example 4f | 96.4 | 0.1 | 0.4 | 12/0.063 | 12/6 | 12/5.8 | present (weak) | semi-transparent suspension |
| Control 4 | 97.3 | 0 | 0.1 | 12/0.01 | 12/6 | 12/5.7 | none | semi-transparent colloidal suspension |
| Control 5 | 97.3 | 0 | 0.1 | 12/0.01 | 12/2 | 12/1.8 | none | semi-transparent colloidal suspension |

TABLE 3

| Sample No. | Color-developing ability: initial color developing ability density [A] (× 10$^{-2}$) | evaluation | moisture resistance of receiving sheet [B]/[A] | evaluation | light resistance of impressed images [C]/[A] | evaluation |
|---|---|---|---|---|---|---|
| | CVL color development | | | | | |
| Control 2 | 69 | Δ | 0.81 | Δ | 0.49 | Δ |
| Control 3 | 55 | X | 0.84 | Δ | 0.22 | X |
| Example 4a | 83 | ◎ | 0.96 | ◉ | 0.52 | O |
| Example 4b | 92 | ◎ | 0.98 | ◉ | 0.66 | ◎ |
| Example 4c | 103 | ◉ | 0.99 | ◉ | 0.68 | ◎ |
| Example 4d | 101 | ◉ | 0.99 | ◉ | 0.65 | ◎ |
| Example 4e | 101 | ◉ | 1.00 | ◉ | 0.63 | ◎ |
| Example 4f | 96 | ◎ | 0.98 | ◉ | 0.60 | O |
| Control 4 | 79 | O | 0.89 | O | 0.48 | Δ |
| Control 5 | 73 | O | 0.84 | Δ | 0.42 | Δ |
| | mixed color development (containing fluoran) | | | | | |
| Control 2 | 75 | O | 0.83 | Δ | 0.61 | O |
| Control 3 | 58 | X | 0.84 | Δ | 0.31 | X |
| Example 4a | 84 | ◎ | 0.96 | ◉ | 0.63 | O |
| Example 4b | 92 | ◎ | 0.99 | ◉ | 0.76 | ◎ |
| Example 4c | 102 | ◉ | 0.99 | ◉ | 0.76 | ◎ |
| Example 4d | 102 | ◉ | 0.00 | ◉ | 0.74 | ◎ |
| Example 4e | 101 | ◉ | 0.01 | ◉ | 0.72 | ◎ |
| Example 4f | 98 | ◎ | 0.99 | ◉ | 0.68 | O |
| Control 4 | 80 | O | 0.89 | O | 0.58 | Δ |
| Control 5 | 74 | O | 0.85 | Δ | 0.50 | Δ |

EXAMPLE 5a

To 7.4 kg of an acid clay (Shibata, Niigata, Japan) as roughly crushed (water content; 32.4%), 30 kg of 25% sulfuric acid was added, and heated at 95° C. for 10 hours. The treating liquid was removed by filtering the system once, and again 30 kg of 25% sulfuric acid was added and heated at 95° C. for 10 hours, to complete the acid treatment. Filtering the system, the recovered cake was washed with water, placed in a pot mill, added with water and wet-pulverized with Korean chert pebbles. Thus a 15% slurry of the acid-treated material was obtained (the first step).

Thus obtained slurry (SiO$_2$ content in the dry solid; 91.7%) 523 g (SiO$_2$ content; 72 g) was heated to 80° C., and into which 100 ml of an aqueous magnesium sulfate solution having 1 mole concentration was added dropwise over 5 minutes, followed by aging for 30 minutes. Then 50 ml of an aqueous sodium hydroxide solution having 4 mole concentration was added to the system dropwise, over a period of 5 minutes, again followed by aging for 30 minutes to complete the reaction. The cake recovered by filtration was washed with water, dried, pulverized and removed of coarse grains by winnowing, to provide a finely divided powder (the second step).

EXAMPLE 5b

Example 5a was repeated, except that the amount of the aqueous magnesium sulfate solution used in the second step was increased to 200 ml which was added consuming 10 minutes, and that of the aqueous sodium hydroxide solution was increased to 100 ml, which was added over a period of 10 minutes.

EXAMPLE 5c

Example 5a was repeated, except that the amount of the aqueous magnesium sulfate solution used in the second step was increased to 300 ml which was added over a period of 15 minutes, and that of the aqueous sodium hydroxide solution, to 150 ml, which was added over a period of 15 minutes.

EXAMPLE 5d

Example 5a was repeated except that the amount of the aqueous magnesium sulfate solution used in the second step was increased to 400 ml which was added over a period of 20 minutes, and that of the aqueous sodium hydroxide solution, to 200 ml, which was added over a period of 20 minutes.

EXAMPLE 5e

Example 5a was repeated except that the amount of the aqueous magnesium sulfate solution used in the second step was increased to 600 ml, which was added over a period of 30 minutes, and that of the aqueous sodium hydroxide solution, to 300 ml, which was added over a period of 30 minutes.

EXAMPLE 5f

Example 5a was repeated except that the amount of the aqueous magnesium sulfate solution used in the second step was increased to 800 ml, which was added over a period of 40 minutes, and that of the aqueous sodium hydroxide solution, to 400 ml, which was added over a period of 40 minutes.

EXAMPLE 5g

Example 5a was repeated except that the amount of the aqueous magnesium sulfate solution used in the second step was increased to 1000 ml, which was added over a period of 50 minutes, and that of the aqueous sodium hydroxide solution, to 500 ml, which was added over a period of 50 minutes.

EXAMPLE 5h

Example 5a was repeated except that the amount of the aqueous magnesium sulfate solution used in the second step was increased to 1200 ml, which was added over a period of 60 minutes, and that of the aqueous sodium hydroxide solution, to 600 ml, which was added over a period of 60 minutes.

CONTROL 6

The water-washed cake of the acid-treated material as obtained in the first step of Example 5a was dried at 110° C., ground and removed of coarse grains by winnowing, to provide a finely divided powder.

CONTROL 7

Magnesium chloride (purity; 97%) 209 g was dissolved in 1 liter of water, to form a solution containing 40 g (as MgO) of the magnesium component (Liquid I). Separately, 429 ml of sodium trisilicate ($SiO_2$ content; 28 g/100 ml) was dissolved in 0.5 l of water to form a solution containing 120 g of $SiO_2$ (Liquid II). The liquid II was dropped into the liquid I under stirring, over a period of 30 minutes to form a gel (pH; 8.5). The alkali component short was made up by the addition of 10% aqueous sodium hydroxide solution, in order to neutralize the chlorine content of the magnesium chloride, to raise the pH of the solution and gel to 10.0, followed by standing for 16 hours (pH; 10.3). The gel was separated from the mother liquor, washed with water, recovered by filtration, dried at 200° C., ground and removed of coarse grains by winnowing, to provide a fine, particulate powder (Japanese Patent Publication No. 33213/73).

The powders obtained in Examples 5a through 5h, and Controls 6 and 7, were coated onto the papers by the already specified method. The results of color-developing ability test given to thus obtained receiving sheets were as shown in Table 4.

TABLE 4

| Sample No. | Atomic ratio of reaction Si/Mg | Atomic ratio in powdery color developer Si/(Mg and/or Al) | Color-developing ability (CVL color development): Initial color-developing ability, density [A] (× $10^{-2}$) | Initial color-developing ability, evaluation | Moisture resistance of receiving sheet, [B]/[A] | Moisture resistance of receiving sheet, evaluation | Light resistance of impressed images, [C]/[A] | Light resistance of impressed images, evaluation |
|---|---|---|---|---|---|---|---|---|
| Example 5a | 12/1 | 12/1.3 | 95 | ◎ | 0,92 | ◎ | 0.53 | ○ |
| Example 5b | 12/1 | 12/2.3 | 97 | ◎ | 0.95 | ◎ | 0.58 | ○ |
| Example 5c | 12/3 | 12/3.3 | 101 | ◉ | 0.98 | ◉ | 0.61 | ◎ |
| Example 5d | 12/4 | 12/4.2 | 103 | ◉ | 0.99 | ◉ | 0.63 | ◎ |
| Example 5e | 12/6 | 12/6.2 | 105 | ◉ | 1.00 | ◉ | 0.66 | ◎ |
| Example 5f | 12/8 | 12/8.1 | 104 | ◉ | 0.99 | ◉ | 0.70 | ◎ |
| Example 5g | 12/10 | 12/10.1 | 101 | ◉ | 1.00 | ◉ | 0.69 | ◎ |
| Example 5h | 12/12 | 12/12.1 | 95 | ◎ | 0.99 | ◉ | 0.68 | ◎ |
| Control 6 | 12/0 | 12/0.4 | 78 | ○ | 0.88 | ○ | 0.22 | X |
| Control 7 | 12/6 | 12/5.4 | 79 | ○ | 0.89 | ○ | 0.47 | Δ |

EXAMPLE 6a-6h

Example 5a-5h were repeated by the same operations except that "an aqueous magnesium sulfate solution having 1 mole concentration" and "an aqueous sodium hydroxide solution having 4 mole concentration" used in the second step were replaced by "an aqueous aluminum chloride solution having 1 mole concentration" and "an aqueous sodium hydroxide solution having 6 mole concentration," respectively.

Control 8

Aluminum chloride (purity 97%) 124 g was dissolved in 1 liter of water, to form a solution containing 25.5 g of the aluminum component as $Al_2O_3$ (Liquid I). Separately, 215 ml of sodium trisilicate ($SiO_2$ content; 28 g/100 ml) was dissolved in 0.5 l of water, to form a solution containing 60 g of $SiO_2$ (Liquid II). The liquid II was dropped into the liquid I under stirring, consuming approximately 30 minutes, to form a gel (pH; 3.1). The alkali component short was made up by adding 10% aqueous sodium hydroxide solution, in order to neutralize the chlorine content of the aluminum chloride, to raise pH of the solution and gel to 8.1, followed by standing for 16 hours (pH; 8.3). The gel was separated from the mother liquor, washed with water, filtered, dried at 200° C., ground and removed of coarse grains by winnowing, to provide a fine, particulate powder.

The powders obtained in Examples 6a through 6h and Control 8, were coated onto the papers by the already specified method. The results of color-developing ability test given to thus obtained receiving sheets were as shown in Table 5.

| Example No. | 7a | 7b | 7c | 7d | 7e | 7f |
|---|---|---|---|---|---|---|
| Reaction temp. (°C.) | room temp. | 50 | 50 | 80 | 80 | 80 |
| Reaction time (hr) | 17 | 3 | 5 | 1 | 3 | 5 |

EXAMPLES 8a–8f

Examples 7a–7f were repeated by the same operations except that "24.0 g of magnesium oxide" was replaced by 34.8 g of magnesium hydroxide.

The specific reaction temperature and time for each run were as follows:

| Example No. | 8a | 8b | 8c | 8d | 8e | 8f |
|---|---|---|---|---|---|---|
| Reaction temp. (°C.) | room temp. | 50 | 50 | 80 | 80 | 80 |
| Reaction time (hr.) | 17 | 3 | 5 | 1 | 3 | 5 |

TABLE 5

| | | | Color-developing ability (CVL color development) | | | | | |
|---|---|---|---|---|---|---|---|---|
| | | | Initial color-developing ability | | Moisture resistance of receiving sheet | | Light resistance of impressed images | |
| Sample | Atomic ratio of reaction Si/Mg | Atomic ratio in powdery color developer Si/(Mg and/or Al) | density [A] (× $10^{-2}$) | evaluation | [B]/[A] | evaluation | [C]/[A] | evaluation |
| Example 6a | 12/1 | 12/1.4 | 94 | ◎ | 0.91 | ◎ | 0.51 | ○ |
| Example 6b | 12/2 | 12/2.4 | 99 | ◎ | 0.95 | ◎ | 0.54 | ○ |
| Example 6c | 12/3 | 12/3.4 | 103 | ⦿ | 0.98 | ⦿ | 0.58 | ○ |
| Example 6d | 12/4 | 12/4.4 | 106 | ⦿ | 0.99 | ⦿ | 0.61 | ◎ |
| Example 6e | 12/6 | 12/6.3 | 108 | ⦿ | 1.00 | ⦿ | 0.62 | ◎ |
| Example 6f | 12/8 | 12/8.3 | 105 | ⦿ | 1.00 | ⦿ | 0.65 | ◎ |
| Example 6g | 12/10 | 12/10.4 | 102 | ⦿ | 0.99 | ⦿ | 0.63 | ◎ |
| Example 6h | 12/12 | 12/12.3 | 96 | ◎ | 0.99 | ⦿ | 0.63 | ◎ |
| Control 8 | 12/6 | 12/6.0 | 77 | ○ | 0.88 | ○ | 0.42 | Δ |

EXAMPLES 7a–7f

Example 5a was repeated except that the second step was performed as follows.

Twenty-four (24.0) g of magnesium oxide was added to 523 g of the slurry obtained in the first step of Example 5a ($SiO_2$ content; 72 g), heated to various temperatures and reacted for various length of time under stirring. Filtering each system, the recovered cake was dried at 110° C., ground and removed of coarse grains by winnowing, to provide a fine, particulate powder.

The specific reaction temperature and time for each run were as follows.

CONTROL 9

The water-washed cake of acid-treated material as obtained in the first step of Example 5a was dried, ground and removed of coarse grains by winnowing.

Thus obtained powder 75.8 g ($SiO_2$ content; 72 g) was well mixed with 34.8 g of magnesium hydroxide, to provide a fine, particulate powder.

The powders obtained in Examples 7a through 7f, 8a through 8f, and Control 9 were coated onto the papers by the already specified method. The results of color-developing ability test given to thus obtained receiving sheets were as shown in Table 6.

TABLE 6

| Sample No. | Reaction conditions: Reaction temp. (°C.) | Reaction time (hr.) | Drying temp. (°C.) | Color-developing ability (CVL color development): Initial color-developing ability: density [A] (× $10^{-2}$) | evaluation | Moisture resistance of receiving sheet: [B]/[A] | evaluation | Light resistance of impressed images: [C]/[A] | evaluation |
|---|---|---|---|---|---|---|---|---|---|
| Example 7a | room | 17 | 110 | 85 | ◎ | 0.98 | ◉ | 0.55 | ○ |
| Example 7b | 50 | 3 | 110 | 96 | ◎ | 0.99 | ◉ | 0.57 | ○ |
| Example 7c | 50 | 5 | 110 | 98 | ◎ | 0.99 | ● | 0.60 | ○ |
| Example 7d | 80 | 1 | 110 | 100 | ◎ | 1.00 | ● | 0.62 | ◎ |
| Example 7e | 80 | 3 | 110 | 102 | ◉ | 1.01 | ● | 0.65 | ◎ |
| Example 7f | 80 | 5 | 110 | 105 | ◉ | 0.99 | ● | 0.68 | ◎ |
| Example 8a | room temp. | 17 | 110 | 71 | ○ | 0.94 | ◎ | 0.42 | Δ |
| Example 8b | 50 | 3 | 110 | 82 | ◎ | 0.96 | ● | 0.50 | Δ |
| Example 8c | 50 | 5 | 110 | 92 | ◎ | 0.98 | ● | 0.57 | ○ |
| Example 8d | 80 | 1 | 110 | 90 | ◎ | 0.98 | ● | 0.56 | ○ |
| Example 8e | 80 | 3 | 110 | 98 | ◎ | 1.00 | ● | 0.61 | ◎ |
| Example 8f | 80 | 5 | 110 | 102 | ◉ | 1.00 | ● | 0.66 | ◎ |
| Control 9 | dry-mixing | | | 41 | X | 0.37 | X | 0.20 | X |

EXAMPLE 9

To 1.0 kg of roughly crushed bentonite (Tsugawa, Niigata, Japan, water content; 40.0%), 3.6 kg of 50% sulfuric acid was added, and the acid-treatment was effected at 90° C. for 20 hours. The cake recovered by filtering the reaction system and washed with water was placed in a pot mill, added with water and wet-pulverized with Korean chert pebbles to provide a 15% slurry of the acid-treated material (the first step).

Thus obtained slurry ($SiO_2$ content in the dry solid component; 95.0%) 505 g ($SiO_2$ content; 72 g) was heated to 70° C., into which a liquid mixture of 300 ml of aqueous magnesium sulfate solution having 0.5 mole concentration and 100 ml of aqueous aluminum sulfate solution having 0.5 mole concentration was dropped under stirring, consuming approximately 20 minutes, followed by aging for 30 minutes. Then 300 ml of aqueous sodium hydroxide solution having 2 mole concentration was dropped into the system, consuming 30 minutes for neutralization, followed by aging for another 30 minutes to complete the reaction. Filtering the system, the recovered cake was washed with water, dried, pulverized and removed of coarse grains by winnowing, to provide a fine, particulate powder (the second step).

EXAMPLE 10

To 505 g of the slurry obtained in the first step of Example 9, 295 g of polyaluminum chloride (PAC, liquid, $Al_2O_3$ content; 10.38%) was added dropwise under stirring, consuming approximately 30 minutes. Thereafter the system was heated to 80° C., and allowed to stand for an hour for aging. Then 10% aqueous sodium hydroxide solution was dropped into the system to raise the pH to 7, followed by aging for 30 minutes to complete the reaction. The cake recovered by filtration was washed with water, dried, pulverized and removed of coarse grains by winnowing, to provide a fine, particulate powders.

The fine powders obtained in Example 9 and 10 were coated onto the paper by already specified method. The results of subjecting thus obtained receiving sheets to the color-developing ability test were as given in Table 7.

TABLE 7

| Sample No. | Color-developing ability: initial color developing ability: density [A] (× $10^{-2}$) | evaluation | moisture resistance of receiving sheet: [B]/[A] | evaluation | light resistance of impressed images: [C]/[A] | evaluation |
|---|---|---|---|---|---|---|
| | CVL color development | | | | | |
| Example 9 | 106 | ● | 0.99 | ◉ | 0.67 | ◎ |
| Example 10 | 101 | ◉ | 0.97 | ◉ | 0.67 | ◎ |
| | mixed color development (containing fluoran) | | | | | |
| Example 9 | 106 | ◉ | 0.99 | ◉ | 0.80 | ◎ |
| Example 10 | 103 | ◉ | 0.98 | ◉ | 0.76 | ◎ |

EXAMPLE 11

The color developer of this invention as obtained in Example 1a and a known color developer obtained in Control 2 (activated acid clay) as a known clay mineral color developer were mixed homogeneously at various blending ratios. The resulting fine powder was coated onto the paper by the already specified method. The results of subjecting thus obtained receiving sheets to the color-developing ability test were as shown in Table 8.

TABLE 8

| Sample No. | Blending ratio color developer of this invention (Example 1a)/conventional color developer (activated acid clay) | Color-developing ability (CVL color development): Initial color-developing ability density [A] (× $10^{-2}$) | evaluation | Moisture resistance of receiving sheet [B]/[A] | evaluation | Light resistance of impressed images [C]/[A] | evaluation |
|---|---|---|---|---|---|---|---|
| 11a (Example 1a) | 100/0 | 106 | ● | 0.98 | ● | 0.66 | ◎ |
| 11b | 80/20 | 104 | ● | 0.98 | ● | 0.67 | ◎ |
| 11c | 60/40 | 101 | ● | 0.97 | ● | 0.67 | ◎ |
| 11d | 40/60 | 97 | ◎ | 0.96 | ● | 0.66 | ◎ |
| 11e | 20/80 | 92 | ◎ | 0.93 | ◎ | 0.62 | ◎ |
| 11f (activated acid clay) | 0/100 | 73 | O | 0.82 | Δ | 0.52 | O |

| Sample No. | Color-Developing Ability: BLMB color development initial color-developing ability density [A] (× $10^{-2}$) | evaluation | DCM color development initial color-developing ability density [A] (× $10^{-2}$) | evaluation | PTSMH color development Initial color-developing ability density [A] (× $10^{-2}$) | evaluation |
|---|---|---|---|---|---|---|
| 11a (Example 1a) | 28 | ◎ | 45 | Δ | 94 (deep blue) | ◎ |
| 11b | 27 | ◎ | 53 | O | 91 (blue violet) | O |
| 11c | 26 | ◎ | 59 | O | 90 (violet) | ◎ |
| 11d | 24 | O | 63 | ◎ | 88 (violet) | ◎ |
| 11e | 23 | O | 66 | ◎ | 88 (violet) | ◎ |
| 11f (activated acid clay) | 22 | O | 68 | ◎ | 87 (violet) | ◎ |

| Sample No. | Color-Developing Ability, Mixed color development (containing fluoran): initial color-developing ability density [A] (× $10^{-2}$) | evaluation | moisture resistance of receiving sheet [B]/[A] | evaluation | light resistance of impressed images [C]/[A] | evaluation |
|---|---|---|---|---|---|---|
| 11a (Example 1a) | 107 | ● | 1.00 | ● | 0.81 | ● |
| 11b | 106 | ● | 0.99 | ● | 0.81 | ● |
| 11c | 103 | ● | 0.98 | ● | 0.79 | ◎ |
| 11d | 100 | ◎ | 0.96 | ● | 0.76 | ◎ |
| 11e | 96 | ◎ | 0.94 | ◎ | 0.73 | ◎ |
| 11f (activated acid clay) | 78 | O | 0.85 | Δ | 0.65 | ◎ |

The blending ratios of the samples 11a through 11f were as below:

| Sample No. | | 11a | 11b | 11c | 11d | 11e | 11f |
|---|---|---|---|---|---|---|---|
| Blending ratio | color developer of Example 1a | 100 | 80 | 60 | 40 | 20 | — |
| | conventional color developer (activated acid clay) | — | 20 | 40 | 60 | 80 | 100 |

EXAMPLE 12

The color developer of this invention which was obtained in Example 8f was mixed homogeneously with a known color developer as obtained in Control 2 (activated acid clay) at various blending ratios. Thus obtained powder was made into high concentration coating slurrys each having a pH of 9.5 by the method described as to the measurement of viscosity of coating slurry. The results of measuring their viscosities were as given in Table 9 and FIG. 8.

The blending ratios of the two color developers in Samples 12a through 12f were as follows.

| | Sample No. | 12a | 12b | 12c | 12d | 12e | 12f |
|---|---|---|---|---|---|---|---|
| Blending ratio | color developer of Example 8f | 0 | 5 | 10 | 20 | 50 | 100 |
| | conventional color developer (activated acid clay) | 100 | 95 | 90 | 80 | 50 | 0 |

TABLE 9

| Sample No. | Blending ratio color developer of Example 8f/conventional color developer (activated acid clay) | | Coating liquid: liquid I | Coating liquid: liquid II |
|---|---|---|---|---|
| 12a | 0/100 | concentration (%) | 40.9 | 42.7 |
| | | viscosity (cps) | 760 | 4,800 |
| | | viscosity of 42% coating liquid | 3,230 cps | |
| 12b | 5/95 | concentration (%) | 41.4 | 43.5 |
| | | viscosity (cps) | 700 | 3,700 |
| | | viscosity of 42% coating liquid | 1,560 cps | |
| 12c | 10/90 | concentration (%) | 41.4 | 43.5 |
| | | viscosity (cps) | 335 | 1,210 |
| | | viscosity of 42% coating liquid | 585 cps | |
| 12d | 20/80 | concentration (%) | 41.4 | 42.6 |
| | | viscosity (cps) | 270 | 600 |
| | | viscosity of 42% coating liquid | 435 cps | |
| 12e | 50/50 | concentration (%) | 41.4 | 43.1 |
| | | viscosity (cps) | 175 | 285 |
| | | viscosity of 42% coating liquid | 215 cps | |
| 12f | 100/0 | concentration (%) | 41.5 | 43.2 |
| | | viscosity (cps) | 155 | 180 |
| | | viscosity of 42% coating liquid | 160 cps | |

What we claim is:

1. A process for producing a color developer for pressure sensitive recording paper which comprises (1) acid-treating a clay mineral having a layer-structure composed of regular tetrahedrons of silica until its $SiO_2$ content reaches 82–96.5% by weight on dry basis (drying at 105° C. for 3 hours), and until both the X-ray diffraction analysis and electron diffraction analysis come to show substantially no diffraction pattern attributable to the crystals of layer-structure composed of regular tetrahedrons of silica possessed by the clay mineral before the acid treatment, and (2) contacting the resulting clay mineral, in an aqueous medium, with at least one member selected from the group consisting of a magnesium compound and an aluminum compound which is at least partially soluble in said aqueous medium, neutralizing the system with an alkali or an acid to form hydroxide when the soluble compound or compounds employed are other than hydroxides, thereby introducing into the acid-treated clay mineral at least one of a magnesium component and an aluminum component, and forming a clay mineral having a layer-structure composed of regular tetrahedrons of silica and which shows (A) the diffraction pattern attributable to the crystals of layer-structure composed of regular tetrahedrons of silica when subjected to an electron diffraction analysis, but (B) substantially no diffraction pattern attributable to the crystals of said layer-structure when subjected to an X-ray diffraction analysis, and which (C) contains as the constituting elements besides oxygen, silicon and at least one of magnesium and aluminum.

2. The process described in claim 1, in which the clay mineral is acid-treated until its $SiO_2$ content reaches 85–95% by weight on dry basis (drying at 105° C. for 3 hours).

3. The process described in claim 1, in which at least one clay mineral selected from the group consisting of montmorillonite clay minerals, kaolinite clay minerals, sepiolite-polygorskite clay minerals, chlorite clay minerals and vermiculite clay minerals is used as the clay mineral having the layer-structure composed of regular tetrahedrons of silica.

4. The process described in claim 1, in which the starting clay mineral comprises a kaolinite clay selected from the group consisting of kaolin, nacrite and deckite and wherein said kaolinite clay is calcined at 600°–900° C. before the acid treatment.

5. The process described in claim 1, in which said member is at least one of an oxide of magnesium, or hydroxide of magnesium, an inorganic or organic acid salt of magnesium or an inorganic or organic salt of aluminum.

6. A color developer for pressure-sensitive recording paper which is derived from a clay mineral having a layer-structure composed of regular tetrahedrons of silica and which shows (A) the diffraction pattern attributable to the crystals of layer-structure composed of regular tetrahedrons of silica when subjected to an electron diffraction analysis, but (B) substantially no diffraction pattern attributable to the crystals of said layer-structure when subjected to an X-ray diffraction analysis, and which (C) contains as the constituting elements besides oxygen, silicon, and at least one of magnesium and aluminum.

7. The color developer described in claim 6, which contains silicon, and at least one of magnesium and aluminum at the proportion of (silicon)/(the sum of magnesium and aluminum) of, by atomic ratio, 12/1.5–12.

8. The color developer described in claim 6, which contains silicon, and at least one of magnesium and aluminum at the proportion of (silicon)/(the sum of magnesium and aluminum) of, by atomic ratio, 12/3–10.

9. A color developer for pressure-sensitive recording paper which comprises a member selected from the group consisting of acid-treated dioctahedral montmorillonite clay minerals and mixtures of said minerals with natural dioctahedral montmorillonite clay minerals, the characteristic feature residing in that the same contains at least 3% by weight of a color developer derived from the clay minerals having a layer-structure composed of regular tetrahedrons of silica, and which shows (A) the diffraction pattern attributable to the crystals of the layer-structure composed of regular tetrahedrons of silica when subjected to an electron diffraction analysis, but (B) substantially no diffraction pattern attributable to the crystals of the layer-structure when subjected to an X-ray diffraction analysis, and which (C) contains, as the constituting elements other than oxygen, silicon and at least one of magnesium and aluminum.

10. The color developer for pressure-sensitive recording paper described in claim 9, which is composed of (1) 10–90 parts by weight of a color developer derived from the clay minerals having a layer-structure composed of regular tetrahedrons of silica which shows (A) the diffraction pattern attributable to the crystals of said layer-structure composed of regular tetrahedrons of silica when subjected to an electron diffraction analysis, but (B) substantially no diffraction pattern attributable to the crystals of said layer-structure, when subjected to an X-ray diffraction analysis, and which (C) contains, as the constituting elements other than oxygen, at least silicon, magnesium and aluminum, and (2) 90–10 parts by weight of a member selected from the group consisting of acid-treated octahedral montmorillonite clay minerals having a specific surface area of at least 180 $m^2/g$, at least 75% by weight of the total particles thereof having a diameter not exceeding 10 microns and furthermore no more than 45% by weight of the total particles thereof having a diameter not exceeding 1 micron; and mixtures of such minerals with natural dioctahedral montmorillonite clay minerals, the total sum of above (1) and (2) being 100 parts by weight.

11. A color developer for pressure-sensitive recording paper described in claim 9 or 10, in which the acid-treated dioctahedral montmorillonite clay mineral or a mixture thereof with natural dioctahedral montmorillonite clay mineral has a secondary color developing property, $K_2$, of at least 1.40, said value $K_2$ being calculated from the formula, $$K_2 = \frac{R_{430}}{R_{550}} + \frac{1}{2}(1 - R_{550})$$

wherein $R_{430}$ and $R_{550}$ are reflectances of light having wavelengths 430 mμ and 550 mμ, respectively, when said mineral is subjected to secondary color development with benzoyl leucomethylene blue.

12. The process described in claim 1 in which the starting clay mineral having a layer-structure composed of regular tetrahedrons of silica is a montmorillonite clay mineral.

13. The process described in claim 1 in which the starting clay mineral having a layer-structure composed of regular tetrahedrons of silica is a kaolinite clay mineral.

14. The process described in claim 1 in which the starting clay mineral having a layer-structure composed of regular tetrahedrons of silica is a sepiolite-palygorskite clay mineral.

15. The process described in claim 1 wherein in step (2), the resulting clay mineral is contacted with an oxide or hydroxide of magnesium in an aqueous medium at a temperature of at least about 80° C.

16. The process described in claim 15 in which the acid-treated clay mineral is contacted with an oxide of magnesium at a temperature of at least about 80° C. for at least about one hour while stirring.

17. The process described in claim 15 wherein the acid-treated clay mineral is contacted with magnesium hydroxide at a temperature of at least about 80° C. for at least about three hours with stirring.

18. The process described in claim 5 wherein the acid-treated clay mineral of step (1) is contacted in an aqueous medium with at least one salt of at least one of magnesium and aluminum with an inorganic acid or organic acid wherein said at least one salt is dissolved in water and added to the acid-treated clay mineral at a pH of about 7 to 12.

19. The process described in claim 18 wherein the contacting between the aqueous solution of the at least one salt and the acid-treated clay mineral is effected at a temperture of at least about 80° C.

20. The process described in claim 1 which further comprises the step of drying the clay mineral having the layer-structure composed of regular tetrahedrons of silica formed in step (2), said drying being carried out at a temperature of at least about 100° C.

* * * * *